US011412757B2

(12) United States Patent
Velez et al.

(10) Patent No.: US 11,412,757 B2
(45) Date of Patent: Aug. 16, 2022

(54) MULTI-FLAVOR FROZEN BEVERAGE DISPENSER

(71) Applicant: FBD PARTNERSHIP, LP, San Antonio, TX (US)

(72) Inventors: Mario A Velez, Converse, TX (US); Edward G Alvarado, San Antonio, TX (US); Alejandro Z Ramirez, San Antonio, TX (US); Daniel J Seiler, Schertz, TX (US); David Renaud, San Antonio, TX (US)

(73) Assignee: FBD Partnership, LP, San Antonio, TX (US)

( * ) Notice: Subject to any disclaimer, the term of this patent is extended or adjusted under 35 U.S.C. 154(b) by 717 days.

(21) Appl. No.: 16/020,645

(22) Filed: Jun. 27, 2018

(65) Prior Publication Data

US 2019/0373913 A1    Dec. 12, 2019

Related U.S. Application Data

(60) Provisional application No. 62/527,272, filed on Jun. 30, 2017.

(51) Int. Cl.
| | |
|---|---|
| *A23G 9/22* | (2006.01) |
| *A23G 9/04* | (2006.01) |
| *A23G 9/16* | (2006.01) |

(52) U.S. Cl.
CPC ............ *A23G 9/224* (2013.01); *A23G 9/045* (2013.01); *A23G 9/163* (2013.01); *A23G 9/166* (2013.01); *A23G 9/228* (2013.01)

(58) Field of Classification Search
CPC ................ A23G 9/224; A23G 9/045
See application file for complete search history.

(56) References Cited

U.S. PATENT DOCUMENTS

| | | |
|---|---|---|
| 2,236,620 A | 4/1941 | Cornelius |
| 2,276,811 A | 3/1942 | Ward |
| 2,562,638 A | 7/1951 | Philipp |
| 2,610,478 A | 9/1952 | Lofstedt |
| 2,735,276 A | 2/1956 | Thompson |
| 3,030,976 A | 4/1962 | Brown |
| 3,280,459 A | 10/1966 | Walker |
| 3,460,717 A | 8/1969 | Thomas |
| 3,468,137 A | 9/1969 | Welty |
| 3,517,524 A | 6/1970 | Fielder |
| 3,661,303 A | 5/1972 | Prosenbauer |
| 3,677,272 A | 7/1972 | Shrank |
| 3,724,235 A | 4/1973 | Carpigiani |
| 3,945,614 A | 3/1976 | Suzuki |
| 4,213,795 A | 7/1980 | Emstsson |
| 4,590,970 A | 5/1986 | Mott |
| 4,736,600 A | 4/1988 | Brown |
| 4,754,609 A | 7/1988 | Black |

(Continued)

*Primary Examiner* — Elizabeth Insler
(74) *Attorney, Agent, or Firm* — McAughan Deaver PLLC

(57) ABSTRACT

The present disclosure provides an improved system and method that includes a food dispensing machine for dispensing a base food product through a dispensing valve and adding ingredients and other additives, such as flavors and the like, to the base food product when the product is dispensed from a product chamber. Apparatuses and methods for maintaining a consistent mix of the base product in the freezing chamber are disclosed as are processes for calibrating desired proportions of ingredients.

20 Claims, 14 Drawing Sheets

(56) References Cited

U.S. PATENT DOCUMENTS

| | | | |
|---|---|---|---|
| 4,784,697 | A | 11/1988 | Bordini |
| 5,209,076 | A | 5/1993 | Kauffman |
| 5,270,013 | A | 12/1993 | Decker |
| 5,388,925 | A | 2/1995 | Wilcox |
| 5,410,888 | A | 5/1995 | Kaiser |
| 5,415,326 | A | 5/1995 | Durham |
| 5,553,756 | A | 9/1996 | Topper |
| 5,632,411 | A | 5/1997 | Harty |
| 5,706,661 | A | 1/1998 | Frank |
| 5,740,844 | A | 4/1998 | Miller |
| 5,743,097 | A | 4/1998 | Frank |
| 5,799,726 | A | 9/1998 | Frank |
| 5,806,550 | A | 9/1998 | Frank |
| 5,899,077 | A | 5/1999 | Wright |
| 5,974,824 | A | 11/1999 | Galockin |
| 6,161,558 | A | 12/2000 | Franks |
| 6,189,745 | B1 | 2/2001 | Frank |
| 6,223,948 | B1 | 5/2001 | Davis |
| 6,513,578 | B2 | 2/2003 | Frank |
| 6,536,224 | B2 | 3/2003 | Frank |
| 6,625,993 | B2 | 9/2003 | Frank |
| 6,637,214 | B1 | 10/2003 | Leitzke |
| 6,877,635 | B2 | 4/2005 | Stratton |
| 7,562,793 | B2 | 7/2009 | Ufheil |
| 8,079,230 | B2 * | 12/2011 | Frank .................. A23G 9/28  62/303 |
| 8,528,786 | B2 | 9/2013 | Gates |
| 8,701,939 | B2 | 4/2014 | Frank |
| 8,960,500 | B2 | 2/2015 | Van Opstal |
| 9,173,521 | B2 | 11/2015 | Gates |
| 9,388,033 | B2 | 7/2016 | Gates |
| 9,457,386 | B2 | 10/2016 | Gates |
| 10,034,488 | B2 | 7/2018 | Graczyk |
| 10,321,699 | B2 | 6/2019 | Gates |
| 10,327,455 | B2 | 6/2019 | Gates |
| 2002/0033021 | A1 | 3/2002 | Frank |
| 2002/0043071 | A1 | 4/2002 | Frank |
| 2003/0037553 | A1 | 2/2003 | Sulc |
| 2003/0126871 | A1 | 7/2003 | Frank |
| 2004/0124548 | A1 | 7/2004 | Rona |
| 2006/0186137 | A1 | 8/2006 | Till |
| 2006/0277932 | A1 | 12/2006 | Otake |
| 2007/0017234 | A1 | 1/2007 | Moulder |
| 2007/0062212 | A1 | 3/2007 | Frank |
| 2007/0125104 | A1 | 6/2007 | Ehlers |
| 2008/0006050 | A1 | 1/2008 | Gist |
| 2008/0041876 | A1 | 2/2008 | Frank |
| 2008/0073609 | A1 | 3/2008 | Akkermann |
| 2008/0202130 | A1 | 8/2008 | Kadyk |
| 2008/0203113 | A1 | 8/2008 | Groh |
| 2008/0254180 | A1 | 10/2008 | Windhab |
| 2008/0289357 | A1 | 11/2008 | Skobel |
| 2008/0302824 | A1 | 12/2008 | Blomme |
| 2009/0000315 | A1 | 1/2009 | Billman |
| 2009/0014464 | A1 | 1/2009 | Adbelmoteleb |
| 2009/0151377 | A1 | 6/2009 | Yonemori |
| 2009/0211269 | A1 | 8/2009 | Gist |
| 2009/0292395 | A1 | 11/2009 | DiFatta |
| 2010/0044395 | A1 | 2/2010 | Webb |
| 2010/0293965 | A1 | 11/2010 | Frank |
| 2010/0319389 | A1 | 12/2010 | Yang et al. |
| 2011/0042414 | A1 | 2/2011 | Tachibana |
| 2011/0049190 | A1 | 3/2011 | Sevcik |
| 2011/0192423 | A1 | 8/2011 | Boussemart |
| 2012/0181287 | A1 | 7/2012 | Holbeche |
| 2012/0186202 | A1 | 7/2012 | Pandurangan |
| 2013/0086930 | A1 | 4/2013 | Scherer |
| 2013/0140328 | A1 | 6/2013 | Gates |
| 2013/0180594 | A1 | 7/2013 | Schneider |
| 2013/0200103 | A1 | 8/2013 | Gates |
| 2014/0061345 | A1 | 3/2014 | Machovina |
| 2014/0209635 | A1 | 7/2014 | Gates |
| 2016/0229675 | A1 | 8/2016 | Popov |
| 2016/0245564 | A1 | 8/2016 | Frank |
| 2016/0245573 | A1 | 8/2016 | Frank |
| 2017/0027185 | A1 | 2/2017 | Acosta |
| 2017/0027188 | A1 | 2/2017 | Raybin |
| 2017/0030467 | A1 | 2/2017 | Versteeg |
| 2017/0064977 | A1 | 3/2017 | Bischel |
| 2017/0225936 | A1 | 8/2017 | Jersey |
| 2018/0103656 | A1 | 4/2018 | Acosta |
| 2018/0106515 | A1 | 4/2018 | Cobabe |

* cited by examiner

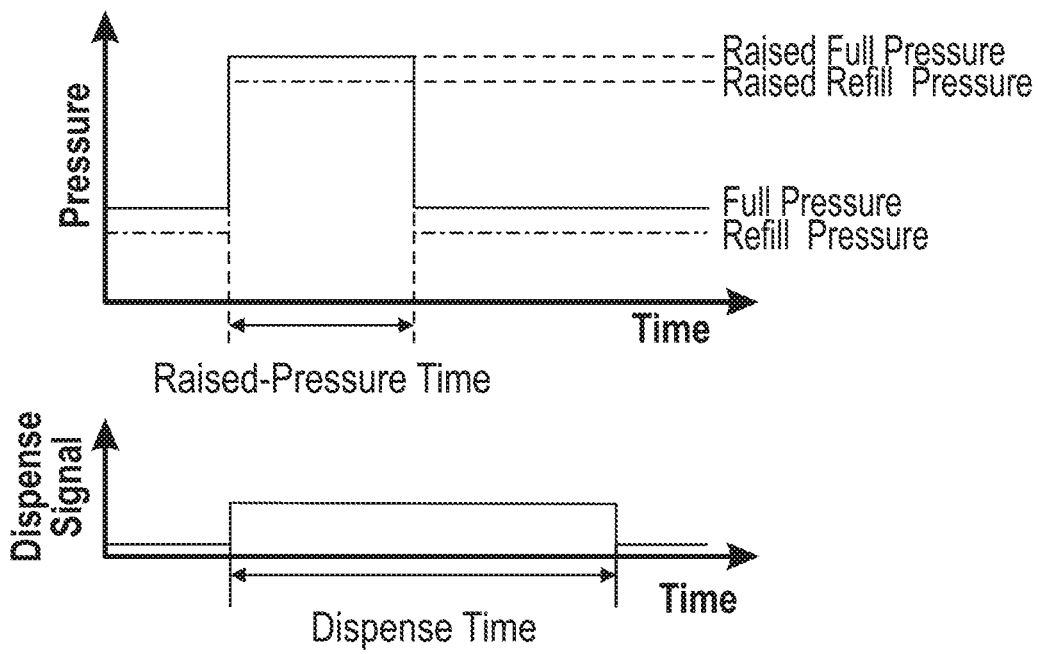

1. When the user wants to dispense a drink, a dispense signal is sent to the fill control system. This can be in the form of a pushbutton, another electronic controller, a mechanical switch, reed switch, etc.

2. Upon receiving the signal, the fill set points are elevated to the "raised refill pressure" and "raised full pressure".

3. The fill set points will be elevated for "raised-pressure time". This allows the pressure sensors and electronics time to sample the barrel pressure after the dispense cycle has already been initiated.

4. The set points are then lowered back to the "full pressure" and "refill pressure".

FIG. 17

MULTI-FLAVOR FROZEN BEVERAGE DISPENSER

CROSS REFERENCE TO RELATED APPLICATIONS

This application claims benefit of and priority to U.S. Provisional Application Ser. No. 62/527,272, filed on Jun. 30, 2017, the entire contents, and disclosure of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to machines for dispensing food products such as frozen and unfrozen beverages and dessert machines.

Description of the Related Art

Dispensing machines that provide a food product such as a beverage or dessert from a product chamber via a dispensing valve are well known. For example, frozen beverage machines produce a frozen beverage by freezing a mixture of ingredients such as syrup, water and carbon dioxide in a mixing or freezing chamber. The freezing chamber is typically surrounded by a coil that contains refrigerant to cause freezing of the mixture inside to a desired level of consistency. The mixture is removed from the inner surface and mixed by a rotating shaft driving one or more scraping/mixing members attached to the shaft. The frozen mixture consistency is controlled by any of a number of methods that turns on the refrigeration to freeze and turns off the refrigeration when the mixture reaches the desired consistency. The product is then dispensed through a dispensing valve that may be automatically or manually controlled.

Such beverage dispensing machines may have a plurality of freezing chambers, each one containing a different type or flavor of beverage. However, space for installing frozen beverage dispensing machines is often at a premium, and requiring several freezing chambers to provide a variety of flavor selections uses valuable space. Further, some users desire the ability to dispense several flavors into one cup. One such disclosure that provides apparatuses and methods related to this is U.S. Patent Application Publication 20080041876, which is hereby incorporated by reference.

The inventions and subject matter disclosed and taught herein are directed to that which overcomes, or at least minimizes, some of the shortcomings of the prior art.

BRIEF SUMMARY OF THE INVENTION

A first non-limiting, brief summary of one of the inventions disclosed herein is a beater bar for a food dispenser having a cylindrical food chamber with a faceplate at one end, the beater bar comprising an axial body having a first end and a second end, and configured at the first end to engage a receptacle in the food dispenser faceplate, and configured at the second end to engage a rotational drive mechanism, so that the body can rotate about a central axis in the food chamber; a plurality of arms radially emanating from the axial body between the first end and the second end, each arm configured to engage at least a portion of a food dispenser scraper such that a leading edge of the scraper engages an inside surface of the food chamber when the body rotates; and at least one paddle emanating from the axial body adjacent the first end, and configured to extend toward but not contact the inside surface of the food chamber and the faceplate, the at least one paddle configured to mix food adjacent the faceplate with other food in the chamber when the body rotates about the central axis.

A second non-limiting, brief summary of one of the inventions disclosed herein is a food dispenser, comprising a cylindrical food chamber having an open end, a second end, and an inside surface; a faceplate configured to seal the open end of the food chamber, and having a inside and outside surface, the inside surface configured with a toroidal channel therein centered about a hub; a beater bar having a first end and a second end, and configured at the first end to engage the hub in the faceplate, and configured at the second end to engage a rotational drive mechanism in the second end of the chamber, so that the beater bar can rotate about a central axis in the food chamber; a plurality of arms radially emanating from the beater bar between the first end and the second end, each arm configured to engage at least a portion of a food dispenser scraper such that a leading edge of the scraper engages the inside surface of the food chamber when the beater bar rotates; and at least one paddle emanating from the beater bar adjacent the first end, and configured to extend toward but not contact the inside surface of the food chamber and the faceplate, the at least one paddle configured to mix food adjacent the faceplate with other food in the chamber when the beater bar rotates about the central axis.

A third non-limiting, brief summary of one of the inventions disclosed herein is a beater bar for a food dispenser, comprising a central bar having a first end and a second end, and configured at the first end to engage a bearing surface in a food dispenser faceplate, and configured at the second end to engage a rotational drive mechanism, so that the central bar can rotate about a central axis in the food chamber; a plurality of arms radially emanating from the central bar between the first end and the second end, each arm configured to engage at least a portion of a food dispenser scraper such that a leading edge of the scraper engages an inside surface of a food chamber when the central bar rotates; and at least one paddle emanating from the central bar adjacent the first end, comprising a blade portion and a stem portion, the blade portion configured to radially extend toward but not contact the inside surface of the food chamber and configured to axially extend beyond an end of the food chamber but not contact the food chamber faceplate, the at least one paddle configured to mix food adjacent the faceplate with other food in the chamber when the central bar rotates about the central axis.

None of these brief summaries of the inventions disclosed herein is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 16 is a chart illustrating methods of pressurizing a barrel during a dispense in accordance with certain teachings disclosed herein.

FIG. 17 is a flow chart illustrating methods of regulating the pressure in a barrel in accordance with certain teachings herein.

Figure 1:
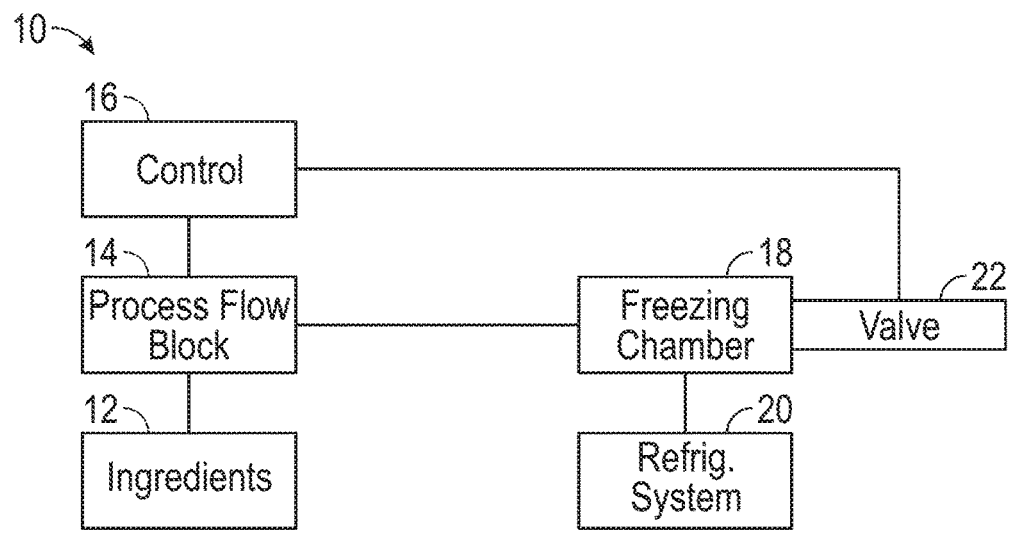
FIG. 1 is a block diagram conceptually illustrating portions of a food dispensing machine in accordance with certain teachings of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time.

While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

We have invented improved systems and methods that includes a food dispensing machine for dispensing a base food product through a dispensing valve and adding ingredients and other additives, such as flavors and the like, to the base food product when the product is dispensed from a product chamber. Apparatuses and methods for maintaining a consistent mix of the base product in the freezing chamber are disclosed as are processes for calibrating desired proportions of ingredients.

FIG. 1 is a simplified block diagram schematically illustrating components of a food dispensing machine 10 in accordance with certain teachings of the present disclosure. In FIG. 1, the food dispensing machine 10 is a frozen beverage machine. The dispensing machine 10 includes an ingredients supply source 12, a process flow block 14, a controller 16, and a product chamber 18. In the exemplary frozen beverage machine 10, the ingredient supply source 12 may include, for example, a water supply, syrup supply and a gas supply. In the illustrated embodiment, the product chamber 18 comprises a freezing chamber having a refrigeration system 20 associated therewith. The term "product" is used to describe the frozen beverage mixture dispensed from the frozen beverage dispenser. The "product" comprises ingredients such as water, syrup or other concentrated substances. A frozen carbonated "product" also includes a gas, such as carbon dioxide. Further descriptions of frozen beverage machines are provided in U.S. Pat. Nos. 5,706,661, 5,743,097, 5,799,726, 5,806,550, 6,536,224, 6,625,993, and 8,701,939, all by J. I. Frank, et. al., and in US Patent Application Publications 20160229675, by Igor V. Popov, et. al. and 20160245573, by J. I. Frank, et. al. The entire disclosures of these patents and applications are incorporated herein by reference.

Ingredients for a frozen beverage mixture are provided from the ingredient supply 12 to the process flow block 14, which controls the flow of the ingredients into the freezing chamber 18 as directed by the controller 16. Mechanisms associated with the process flow block 14 may include sensors, actuators, and other components needed for operation. The controller 16 may comprise an appropriately programmed microprocessor, microcontroller, suitable memory devices, and other components needed for operation. The frozen mixture consistency is controlled by any of a number of methods that turns on the refrigeration system 20 to freeze the ingredients in the chamber, and turns off the refrigeration system 20 when the mixture reaches the desired consistency. Suitable operation of the controller 16 and other control instrumentation using circuit boards, volatile and non-volatile memory devices, software, firmware, and the like is described, for example, in U.S. Pat. No. 5,706,661, which is incorporated by reference. The product is then dispensed through a dispensing valve 22.

Figure 2:
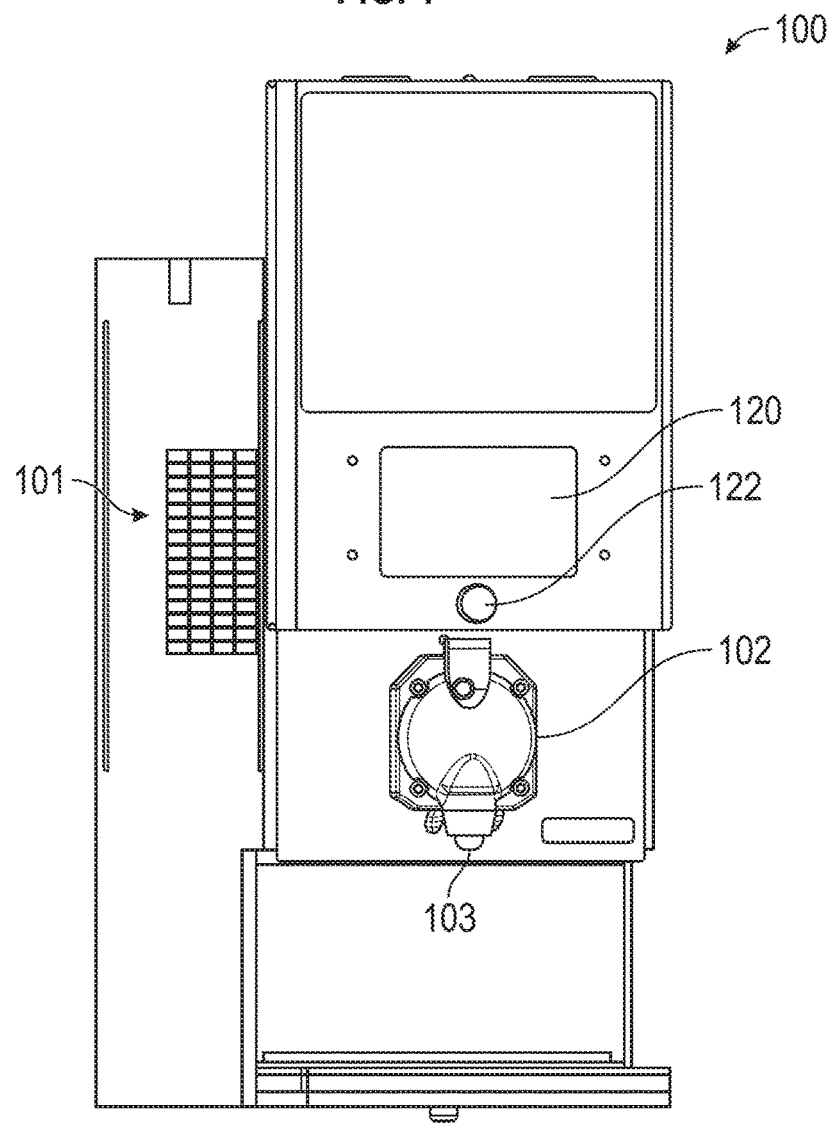
FIG. 2 is a perspective view of an exemplary embodiment of a food dispensing machine in accordance with certain teachings of the present disclosure.

FIG. 2 is a perspective view of an exemplary embodiment of the dispensing machine 10. The various components of the machine 100 are housed in a cabinet 101, with the dispensing valve (not shown) behind a faceplate 102, terminating in a dispensing nozzle 103. In one of many possible embodiments, the dispensing valve 22 may be pneumatic and controlled through the controller 16, rather than manual operation by a user. Similarly, the injection of flavor may be accomplished through the use of solenoid valves activated during the dispensing operation by the controller 16. The faceplate 102 may be removably secured to the cabinet 101 through any number of methods including, but not limited to threadable members such as screws or bolts. The attachment of the faceplate 102 to the machine 100 will enclose the freezing barrel yielding a freezing chamber 18 (not shown in FIG. 2.)

Some manner of user interface may be available on the exterior of the machine 100. This may provide a method of interacting with the machine 100 by a customer desiring a frozen beverage, the owner of the machine, a service technician, or any number of other people. In one of many possible ways, interaction with the machine 100 may be through a human interface device 120 and a dispense button 122, or any of a number of other input methods and processes including but not limited to a computer interface, a touchpad, a keyboard, other types of human interface devices, or other means.

Figure 3:
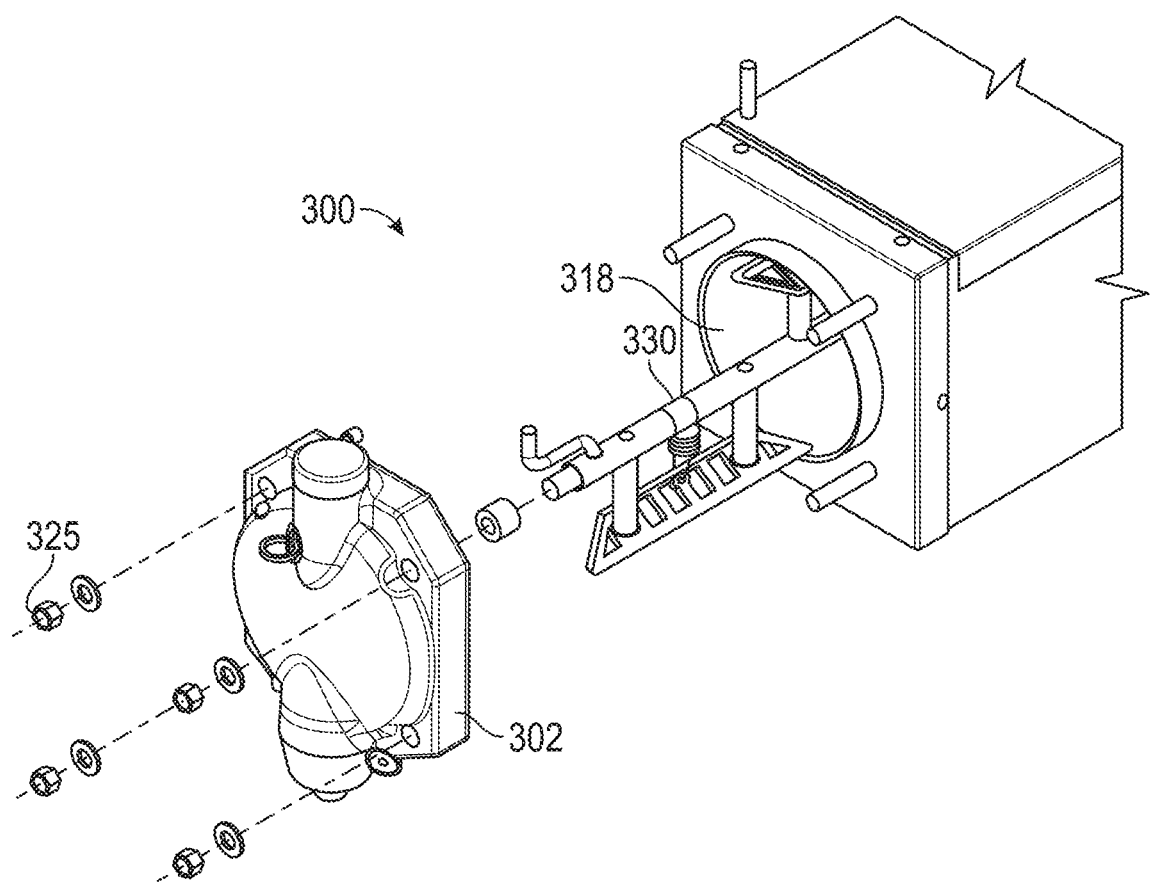
FIGS. 3 and 4 illustrate an embodiment of a product dispenser system in accordance with certain teachings set forth herein.

The main freezing chamber of the main system structure 100 includes a front opening through the faceplate 102. The faceplate 102 cooperates with a valve assembly in such a way that when the valve 22 is actuated, the freezing chamber 18 dispenses the product out of dispensing nozzle 103. A product to be dispensed, such as a frozen carbonated beverage, may be maintained within the freezing chamber at a pressure in the range of 3-30 pounds per square inch (20.7-206.8 kPa). This pressure may be used to drive product through the dispensing path and out of the dispensing nozzle 103 when the valve 22 is open. One of many possible embodiments of this is illustrated in FIG. 3 where the faceplate 302 may form a seal with the freezing barrel 318. In this embodiment, the interior of the faceplate 302 may be a flat surface with an opening controlled by a valve 22. In this exemplary embodiment, a beater bar 330 may be connected to a drive shaft (not shown) to mix the ingredients, to scrape the frozen particles away from the sides of the freezing barrel 318, and to push product towards the front of the freezing chamber.

Figure 4:
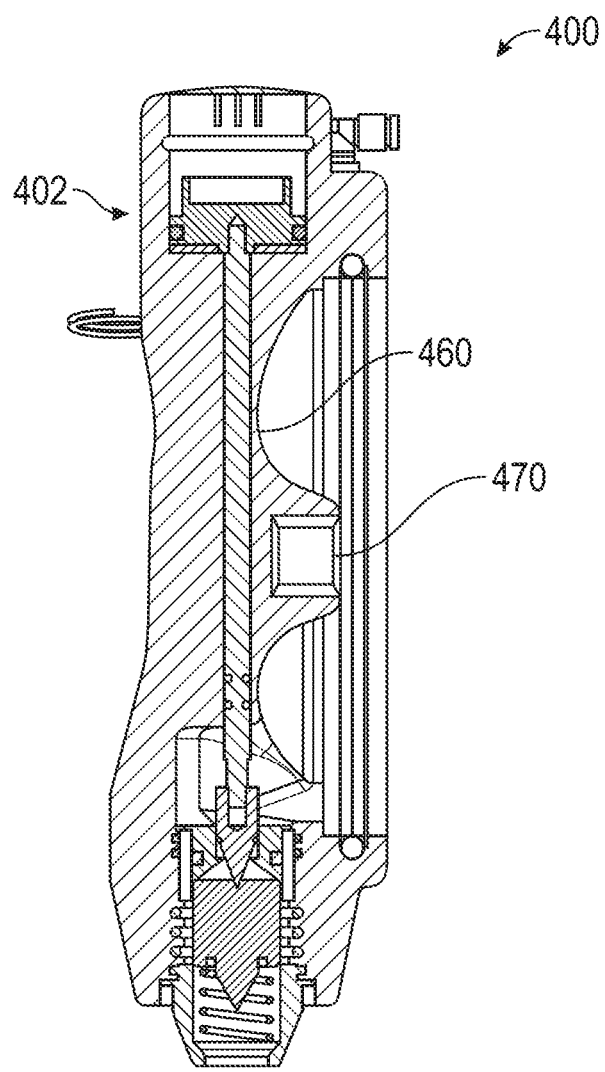

FIG. 4 illustrates an embodiment wherein the inner surface 460 of the faceplate 402 may be concaved, providing a greater volume for the freezing chamber 18. In concaved embodiments, the faceplate may be fully concaved wherein the interior shape of the faceplate is hemispherical, or it may be of a toroidal nature as illustrated in FIG. 4, wherein the center of the concaved volume tapers inwards towards the center of the faceplate 402. In this embodiment, the drive shaft (not shown) is centered and supported within the centermost protrusion 470 of the inside face of the faceplate 402.

Known dispensing systems typically include two or more freezing chambers 18 that are cooled with a single refrigeration system 20. In accordance with exemplary embodiments disclosed herein, the exemplary system 10 includes a single chamber 18 that contains a base liquid, frozen beverage, or other base product. Generally, when the base product is dispensed, additives may be selectively injected. Thus, beverages of several different flavors can be provided without the cost and space requirements of multiple product chambers. This is advantageous in areas where a larger multi-barrel dispenser cannot be accommodated but multiple flavors are desired. Other embodiments are envisioned that include, for example, multiple chambers wherein each chamber has a different base flavor to which additional flavors are injected.

Within the freezing chamber is a rotating shaft to which are attached one or more protuberances. As the shaft rotates, the protuberances engage the sides of the chamber to scrape the frozen particles off of the sides of the freezing chamber and mix them with other ingredients within the chamber. The rotating shaft and protuberances may be fashioned in any number of different ways. In some prior art embodiments scrapers have been fixedly secured to a central shaft. Care would then have to be taken when removing or inserting the beater from the chamber so the scrapers would not be bent, and the scrapers would not scratch the sides of the chamber.

Figure 5:
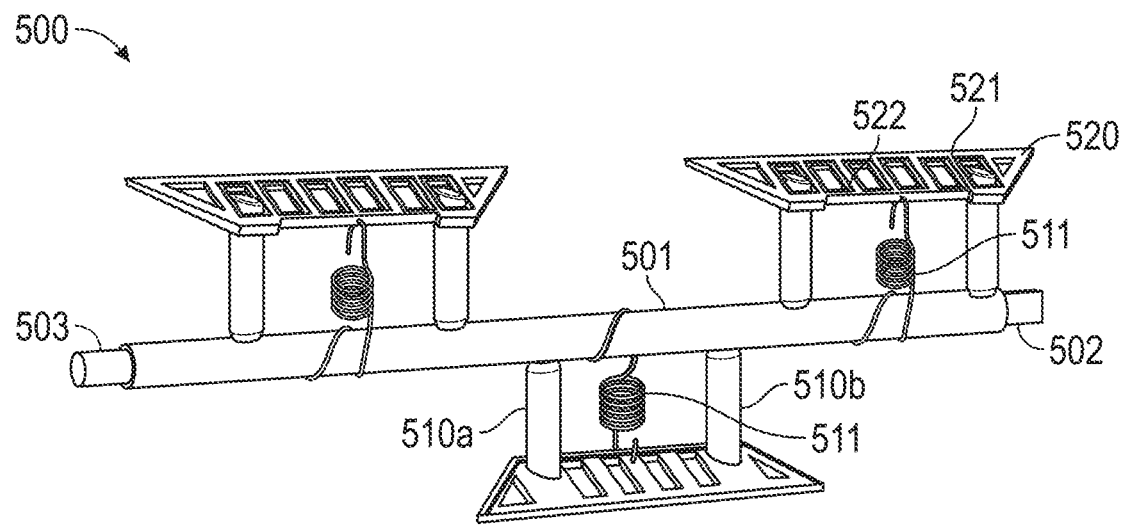
FIGS. 5 and 6 are views of a beater bar of a frozen beverage machine in accordance with certain teachings of the present disclosure.
Figure 6:
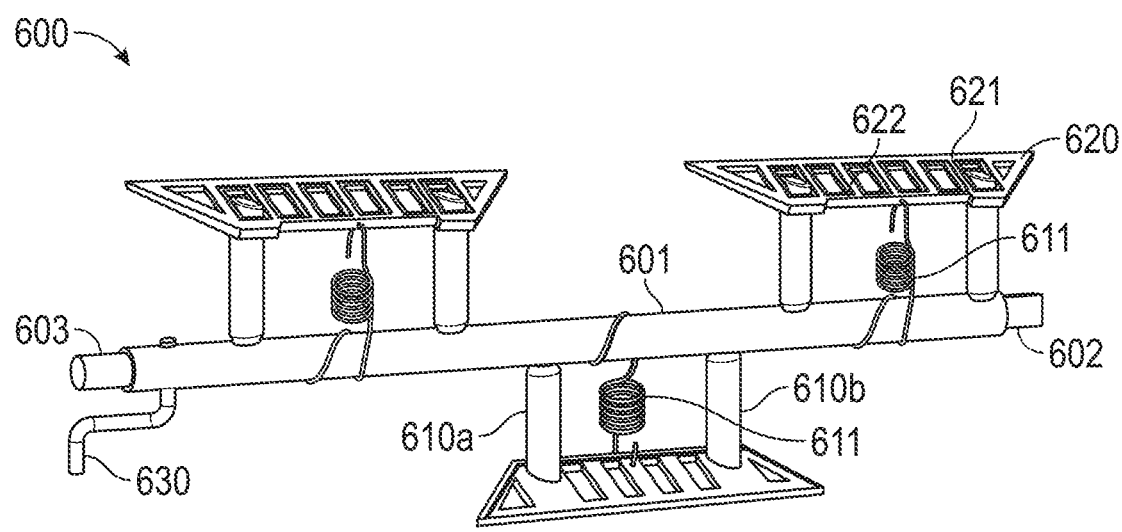

FIGS. 5 and 6 provide illustrations of exemplary beater bars 500, 600 commonly used in frozen beverage machines.

First, turning to FIG. 5, the central bar 501 may have a drive end 502 designed to cooperate with a drive mechanism. The front end 503 may be designed to cooperate with a receiving receptacle of a faceplate 402 as illustrated in FIG. 4.

FIG. 5 shows three scrapers arranged along the length of the central bar 501, which are identical in this embodiment. While this embodiment shows all of the scrapers along an axial plane through the central bar 501, others skilled in the art may envision other arrangements without departing from the inventions disclosed herein. A typical scraper in this embodiment is supported by two legs 510a, 510b which may have tapered ends to fit within receiving holes in the central bar 501. The legs 510a, 510b may be fixedly secured to the central bar 501 through any of a number of methods including but not limited to an interference fit, a tack weld, or a TIG weld, or through other mechanical means such as threadable fasteners. Alternatively, the legs 510a, 510b may be removably secured to the central bar 501.

The legs 510a, 510b should not extend in length past the diameter of the inside of the freezing chamber 18. An optimal length of the legs 510a, 510b may be that they extend to approach the inside of the freezing chamber 18 when so inserted. At the distal ends of the legs 510a, 510b may be mounted a scraper plate 520, which will have a leading edge 521 and a trailing edge 522. Various methods may be deployed to mount the scraper plate 520 to the legs 510a, 510b. One of many possible methods may be to have shoulders at the distal ends of the legs 510a, 510b and cooperating holes in the scraper plate 520 such that the scraper plate 520 may pivot or rock circumferentially relative to the central bar 501.

In the exemplary embodiment of FIG. 5, the scraper plate 520 may be retained to the legs 510a, 510b with a spring 511. In this exemplary embodiment, the spring 511 serves the purpose of retaining the scraper plate 520 to the legs 510a, 510b, and another purpose of biasing the trailing edge 522 of the scraper plate 520 towards the central bar 501. Since the scraper plate 520 may pivot or rock atop the legs 510a, 510b, the bias of the trailing edge 522 towards the central bar 501 will raise the leading edge 521 outwards, away from the central bar 501. When inserted into a freezing chamber 18, the bias on the trailing edge 522 may promote contact between the leading edge 521 of the scraper bar 520 and the inside of the freezing chamber 18. Therefore, when the beater bar 500 is rotated, the leading edge 521 of the scraper plate 520 will scrape ice particles away from the inside of the freezing chamber 18. It may also be advantageous to have some amount of overlap between the leading edges 521 as they scrape the inside of the freezing chamber 18.

FIG. 6 depicts a beater bar 600 similar to that in FIG. 5 with an addition of a stirrer 630 mounted near the front end 603 of the central bar 601. The stirrer 630 may be secured to the central bar 601 in any number of ways and may have any number of shapes. The exemplary stirrer 630 extends forward from the front end 603 of the central bar 601 so that when the beater bar 600 is rotated, the stirrer 603 stirs the product in the freezing chamber 18 that is in the extended area within the faceplate as shown in FIG. 4. The stirrer 630 is fashioned in such a way as to avoid contact with any other parts such as the freezing chamber 18 and the interior of the faceplate. In this fashion, the stirrer 630 may stir the mixture that would otherwise not be moved by the scraper plates 620. This may be desirable inasmuch as the product in the toroidal area in the faceplate is not receiving cooling from the refrigerant running through the coils surrounding the freezing barrel and may become warmer than the product that has more direct contact with the inside of the freezing chamber. Applicants have found that the stirrer 630 provides some mixing of the product in the forward part of the freezing chamber with the product further back. While this is advantageous over the prior art, the effect does not always provide a mixture of consistent temperature throughout the freezing chamber.

Applicants have devised a beater bar that includes a paddle at the forward end of the central bar. As the beater bar rotates within the barrel, the paddle may provide more desirable mixing of the frozen base in the forward part of the freezing chamber that otherwise may not be mixed by the scrapers even in combination with a stirrer. One of many possible embodiments of this is exemplified in FIGS. 7 through 10.

Figure 7:
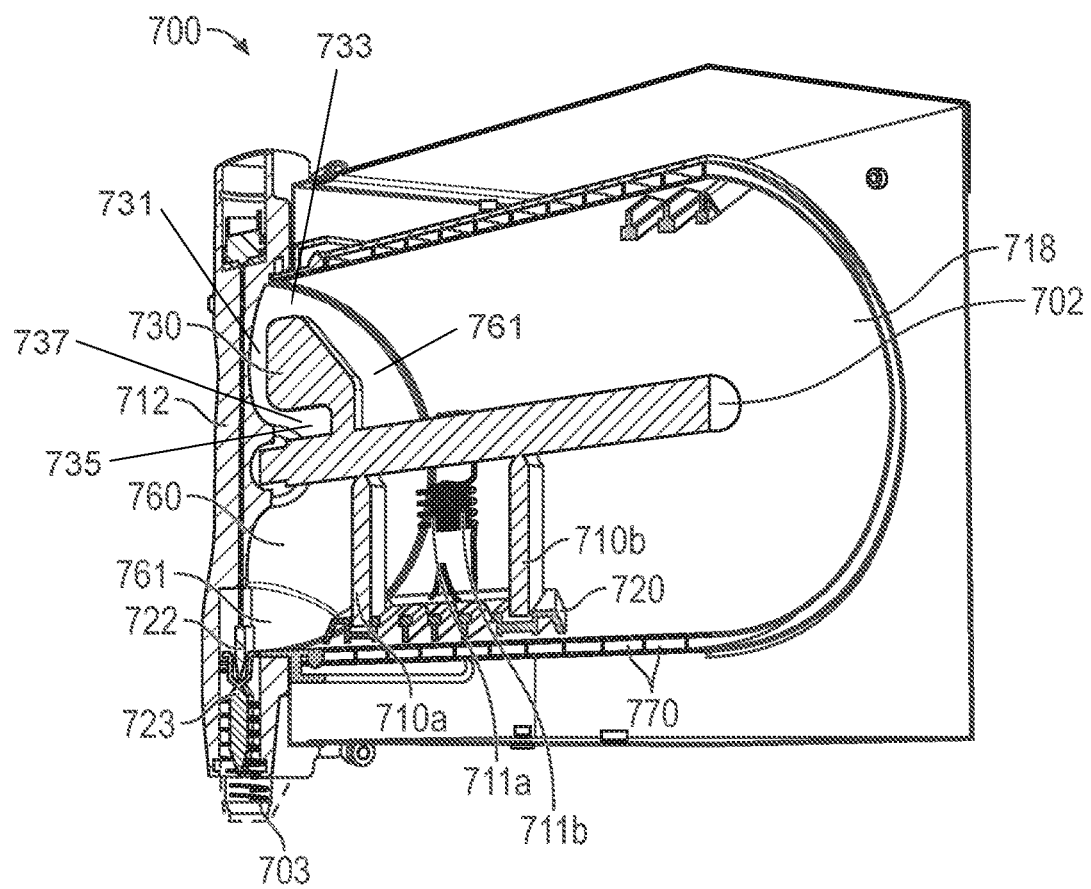
FIG. 7 is a cut-away view of a frozen beverage machine conceptually illustrating portions of a frozen beverage machine in accordance with certain teachings of the present disclosure.

FIG. 7 illustrates one of many possible embodiments of the inventions devised by the applicants, which shows a cut-away view of an exemplary beater bar deployed within the freezing chamber of an exemplary frozen beverage machine 700. The freezing chamber comprises the freezing barrel 718 sealed with the interior surface 760 of a faceplate 712. The faceplate 712 has an opening 761 that cooperates with a valve 722 such that when the valve 722 is open, product will be dispensed out of the dispensing nozzle 703. In this exemplary embodiment, the interior surface 760 of the faceplate 712 is toroidal as was exemplified in FIG. 4. Those sufficiently skilled in the art will know that other faceplate geometries may be utilized without departing from the inventions disclosed herein.

In the exemplary frozen beverage machine 700, paddle 730 is secured to the central bar 702, which also may be considered an axial body. As was noted earlier, when the central bar 702 is rotated, the scrapers 15 will scrape frozen particles away from the interior of the freezing barrel 718. The legs or arms 710a, 710b and the topology of the scraper plate 720 may also aid in mixing the particles that have been scraped away from the interior of the freezing barrel 718. The portion of the product in the forward part of the mixing chamber may become warmer than the rest of the product in the mixing chamber because it is not in direct contact 20 with the refrigerating coils 770. The paddle 730 may more thoroughly mix the product in the forward portion of the mixing chamber with the product nearer to the refrigerating coils 770 in the freezing barrel 718 thereby producing a more consistent mix of product throughout the mixing chamber.

In this process of mixing the frozen base, the paddle 730 pushes frozen mix in an area 761 formed by the internal surface 760 that may not otherwise be stirred by the scrapers. In this embodiment, the paddle 730 is a flat plate that extends into the area 761 forward of the freezing barrel 718. As illustrated in FIG. 7, the paddle 730 may be spaced apart from the internal surface 760 by a first axial gap 731. Further, the paddle 730 may be spaced apart from freezing barrel 718 by a first radial gap 733 and may be spaced apart from the axial body 801 by a second radial gap 735. In operation, the paddle 730 pushes against the mixture thereby adding a pressure to the mixture rotationally ahead of the paddle 730. This produces a corresponding pressure decrease in the area rotationally behind the paddle 730 causing the mixture to flow around the paddle 730 into that area. As noted previously, this movement may aid in maintaining a consistent temperature of the mixture within the freezing chamber by mixing the fluid and particles that are further away from the freezing barrel 718 with those that are nearer the freezing barrel 718.

In the exemplary frozen beverage machine 700, the process for dispensing the beverage is to open the valve 722, which permits fluid communication from the freezing chamber at the opening 761, through the flow path, and out the dispensing nozzle 703. When the frozen beverage machine 700 is operating normally, there will be sufficient product in the freezing chamber so that multiple serving containers, such as cups, glasses, or mugs, may be filled sequentially. At times when the product is dispensed, new ingredients may be added thereby maintaining a fluid of liquid and ice crystals mixed with gas. The above-atmospheric pressure in the chamber will push the mixture of liquid and ice crystals out when the valve 722 is opened. An auger, or other mechanism configured to push ingredients in a direction may be useful in ensuring that product is disposed towards the opening 761 even when the ingredients are running low.

Applicants have noted that in some cases, when the valve 722 is actuated large ice crystals may become lodged between the valve stem and the sealing surface, thus preventing it from closing when it should. Employing an auger or similar mechanism that will push product towards the front may exacerbate the situation by continually pushing product through a valve 722 that may become stuck open. Applicants have found that a paddle 730 on a central bar 701 clears out the ice crystals that may accumulate around the valve area inside the chamber. Dispersing these ice crystals from the area near the valve prevents them from forming a clog that may otherwise keep the valve from properly sealing.

Figure 8:
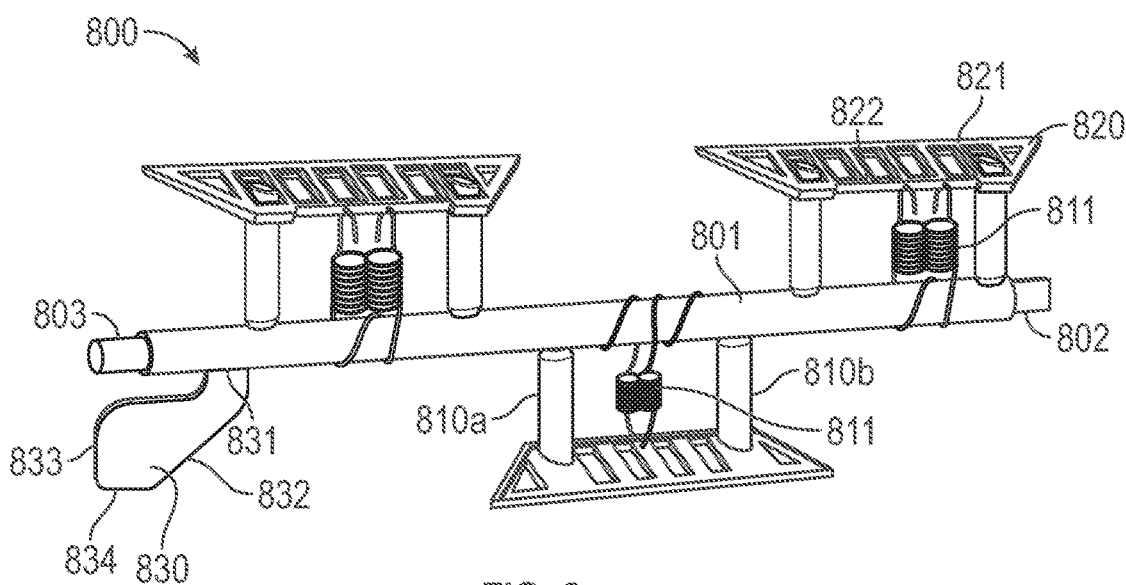
FIGS. 8 and 9 are views of a beater bar of a frozen beverage machine in accordance with certain teachings of the present disclosure.

FIG. 8 depicts an exemplary central bar 801 with a paddle 830. In this exemplary illustration, the paddle 830 may be fashioned by cutting it from a plate through the use of a laser cutter, which may produce a paddle 830 with cleaner edges than traditional methods. Other methods of producing a paddle include, but are not limited to, traditional methods of cutting and shaping metal, water jet cutters and 3D printers. Applicants have also found a preferred embodiment of welding the paddle 830 to the central bar 801 entirely along edge 831 to secure the paddle 830 to the central bar 801 so that it does not allow any openings or recesses where particles or fluids may become trapped. However, using other methods such as a tack weld, or even removably securing the paddle to the central bar, may have other advantages. A sloping trailing edge 832 has been found to assertively mix the fluids and particles in the toroidal area with the fluids and particles throughout the rest of the freezing chamber resulting in very consistent temperatures and mixtures throughout. Rounding the corners of the leading edge 833 has been found to allow the leading edge 833 to be positioned closer to the interior of the faceplate without actual contact, which may result in scratching the interior of the faceplate. The distal edge 834 of the paddle 830 will sweep nearest to the opening from the freezing chamber to the valve.

Figure 9:
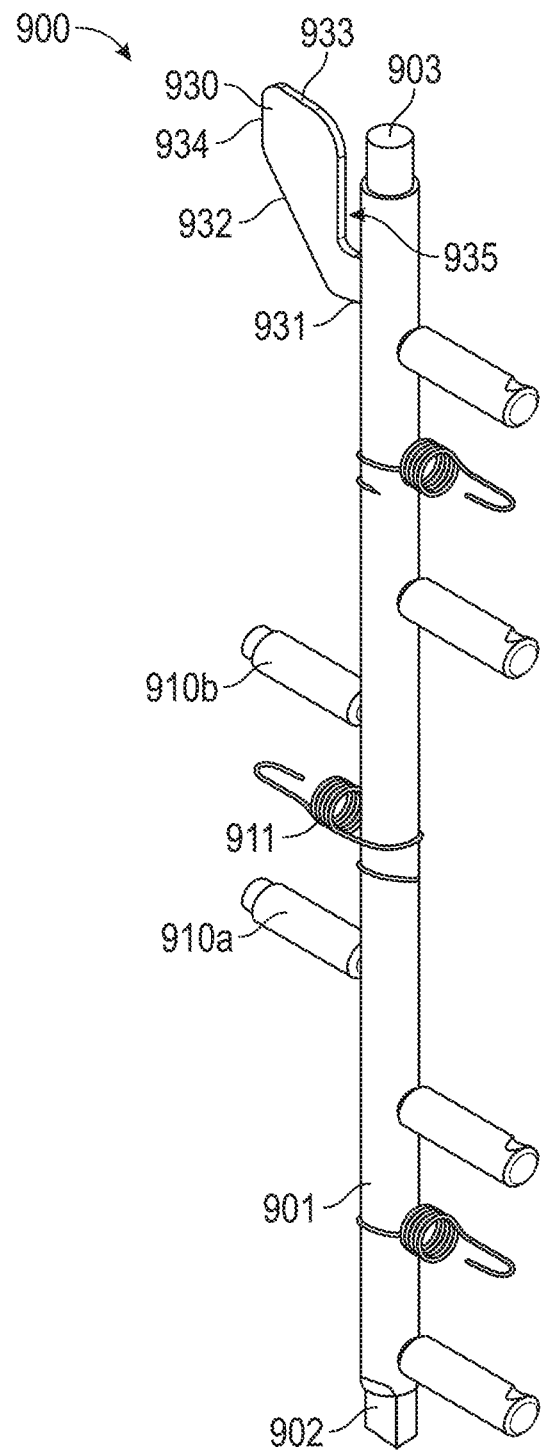

FIG. 9 illustrates a perspective view of an exemplary beater bar with a paddle 930. In this embodiment, the proximal edge 935 is positioned closer to the central bar 901. This may be preferable for use with some base products within the freezing chamber.

Figure 10A:
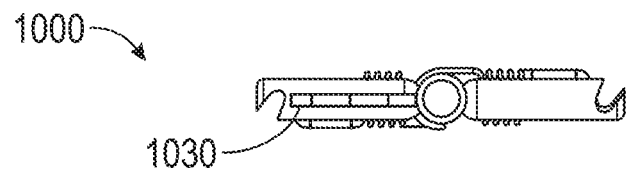
FIGS. 10a and 10b are engineering drawings of a beater bar of the frozen beverage machine in accordance with certain teachings of the present disclosure.
Figure 10B:
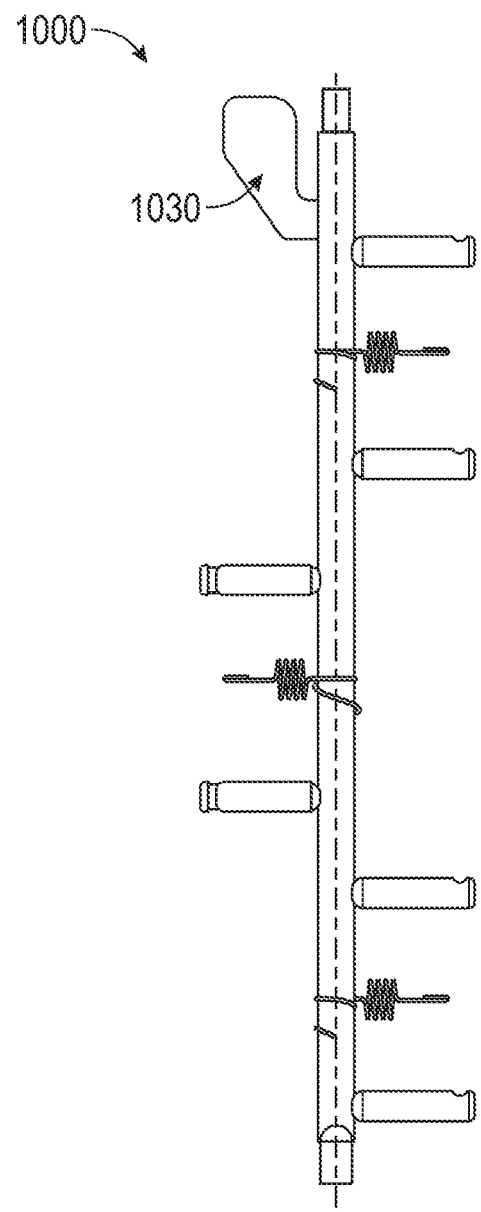

FIGS. 10A and 10B represent engineering drawings of an exemplary beater bar with a paddle 1030.

Other embodiments of the inventions disclosed herein may include that the paddle be made of a material, or covered with a material that will not scratch the faceplate when they are in contact. This may allow the paddle to be positioned in such a way that it does contact the faceplate in its rotation to fully mix fluids and particles that may accumulate near the faceplate with fluids and particles throughout the rest of the freezing chamber. In another envisioned embodiment, the trailing edge may be angled laterally away from the axial plane of the central bar. An angle resulting from adjusting the forward edge towards the direction of rotation will tend to act like a scoop to pull fluids and particles from the front of the freezing chamber towards the freezing barrel. Similarly, an angle resulting from adjusting the forward edge away from the direction of rotation will act as a vane to draw particles from the back of the freezing chamber towards the faceplate. In one of many possible envisioned embodiments, the paddle may be constructed in such a way so that the leading edge is flared such that the side facing towards the direction of rotation is angled towards that direction, and the side facing away from the direction of rotation is angled away from that direction. In yet another envisioned embodiment, the leading edge may be segmented or corrugated in such a way that alternating segments are adjusted towards and away from the direction of rotation.

Similarly, the distal edge of the paddle may be angled towards or away from the direction of rotation. Angling the distal edge in any way may be combined with adjusting the angles of the leading edge in further envisioned embodiments.

In yet another envisioned embodiment, the paddle need not be entirely impervious or flat. The paddle may contain dimples, or other protuberances, or one or more holes, which may be straight through, or angled. These structures may be used to further facilitate mixing in the area near the faceplate.

In another envisioned embodiment, other pieces may be securely or removably attached to the paddle. One example, of many possible, of a piece that may be attached is a flexible member made of material that will not scratch the inner surface of the faceplate. In this envisioned embodiment, the flexible member may be designed to contact the inner surface of the faceplate while the paddle and central bar rotate thereby moving product away from the inner surface of the faceplate.

In the process of dispensing the frozen base product from the mixing chamber, one or more flavors may be added. In one embodiment, this may be done by allowing a substance containing a flavor to be simultaneously dispensed from the dispenser into a receiving container such as a glass, cup, or mug while dispensing a base mixture from the freezing barrel. The frozen base product may have a neutral flavor, or it may have a base flavor that will be enhanced or accentuated by the addition of one or more flavors. In the latter case, an exemplary base flavor may be a cola flavor or a fruit flavor. A multi-flavor beverage dispenser may have any number of chambers containing flavors that may be dispensed with the base mixture from the freezing chamber. Commonly, the flavor substance is a liquid akin to syrup and is delivered in liquid form, but it need not be limited to only that form to practice the inventions described herein.

As noted before, one embodiment of a multi-flavor beverage dispenser is disclosed in U.S. Patent Application 20080041876, which is incorporated by reference.

In one embodiment when a drink is requested by a consumer, a specific volume of the requested drink may be dispensed. This volume may be enough to fill a container of a known size to a level just below the brim. Alternatively, if the confection has a stiff consistency, it may be preferable to dispense an amount that fills the container to a level just below the brim, and to continue to dispense an amount that provides a peak of product above, and centered within the brim of the container to provide a visually appealing quality. In these, and other embodiments, specific amounts of flavor and base mix will be measured out during the dispense process. As an example and depending upon the concentration, the flavor substance may be 10% of the volume to be dispensed, with the other 90% of the volume being the base mixture. With the same concentration, a stronger flavor profile may be produced by using proportionally more flavor substance to base mixture. Conversely, a weaker flavor profile may be produced by using a proportionally smaller amount of flavor substance to a proportionally greater portion of base mixture.

In another embodiment, a consumer may prefer to mix flavors in a dispensed drink. To ensure proper mixing of the flavors throughout the entirety of the drink, all of the desired flavors will need to be dispensed and mixed with the base mix as it is being dispensed. In one exemplary embodiment, a consumer may desire a flavor profile of flavors grape and bubble gum. One method of providing this may be to meter out 90% of the volume with base mixture, 5% volume of flavor grape, and 5% volume of flavor bubble gum. This will provide a drink with the desired flavor profile, which will not exceed the expected volume of the receiving container.

In another of many possible embodiments, a drink may be formed by consecutively mixing a portion of a flavor substance with one part of the base mixture, then another portion of a different flavor substance with another portion of base mixture, and so on during the dispense process to provide layers of different flavors in the receiving glass, cup, or mug. The proportions of flavor substance to base mixture will need to be metered to provide a desirable flavor profile.

Repeatedly providing a beverage with a consistent flavor profile is commonly a goal in frozen beverage dispensers. Having inconsistencies in the flavor profile may lead to beverages with unsatisfactory flavor profiles. Also, inconsistently metering portions may lead to some ingredients being dispensed at higher or lower than expected rates, which may cause the beverage dispenser to run out of ingredients sooner than expected.

Applicants have created methods and apparatuses to inject flavors into drinks.

Referring to FIG. 7, a frozen beverage dispensing machine 700 normally operates by flowing a base mixture from the freezing chamber through the valve 722 when it is open, along the dispensing path 723, and out the dispensing nozzle 703. Flavor substances, which are usually liquids, are injected into the dispensing path 723 during the dispensing operation resulting in a blend of base mixture and flavor as the combined product flows out of the dispensing nozzle 703. In some situations, it may be preferable to inject the flavor substance during the entirety of the time that the base mixture is flowing so that all parts of the drink have the same flavor profile throughout the receiving vessel, which is usually a cup, mug, or glass. Alternatively, the inventors have found that the flavor ingredient may be added to the base product in a number of different ways.

One of many possible methods of injecting flavor substances into a drink while dispensing a base product has been shown in US Patent Application Publication 20160229675, the contents of which are incorporated herein by reference. The inventions disclosed and taught herein are not limited by or bound to disclosures in that Publication. However, in some ways reference to that Publication may aid in the description and explanation of the inventions disclosed and taught herein.

In one embodiment of the inventions disclosed herein, a multi-flavor machine may have several flavor injectors that may inject different flavors into a dispense path while dispensing a base product. The flavor substances may also be individually colored. Injecting different flavor substances at different times during the dispensing of the base product may yield a drink that has different flavors and different colors at different depths in the receiving receptacle, such as a glass, cup, or mug. One such example may be in filling a glass or other clear container with a confection having red, white, and blue colors, which may be desirable during U.S. holidays. In one embodiment, this may be done by having a base product with a white color and then injecting red and blue colors at appropriate times so the red and blue layers are separated by a white layer. However, in some cases, applicants have found that mixing colors close together, such as by having a blue layer immediately followed by a red layer, may produce a dark band. This may be from the interaction between the two colors. In some situations, this may be desirable, but in other situations, this may be undesirable. Applicants have found that the dark band may be minimized or obviated by having a time in which the base product is dispensed without any colored flavor being injected.

Figure 12:
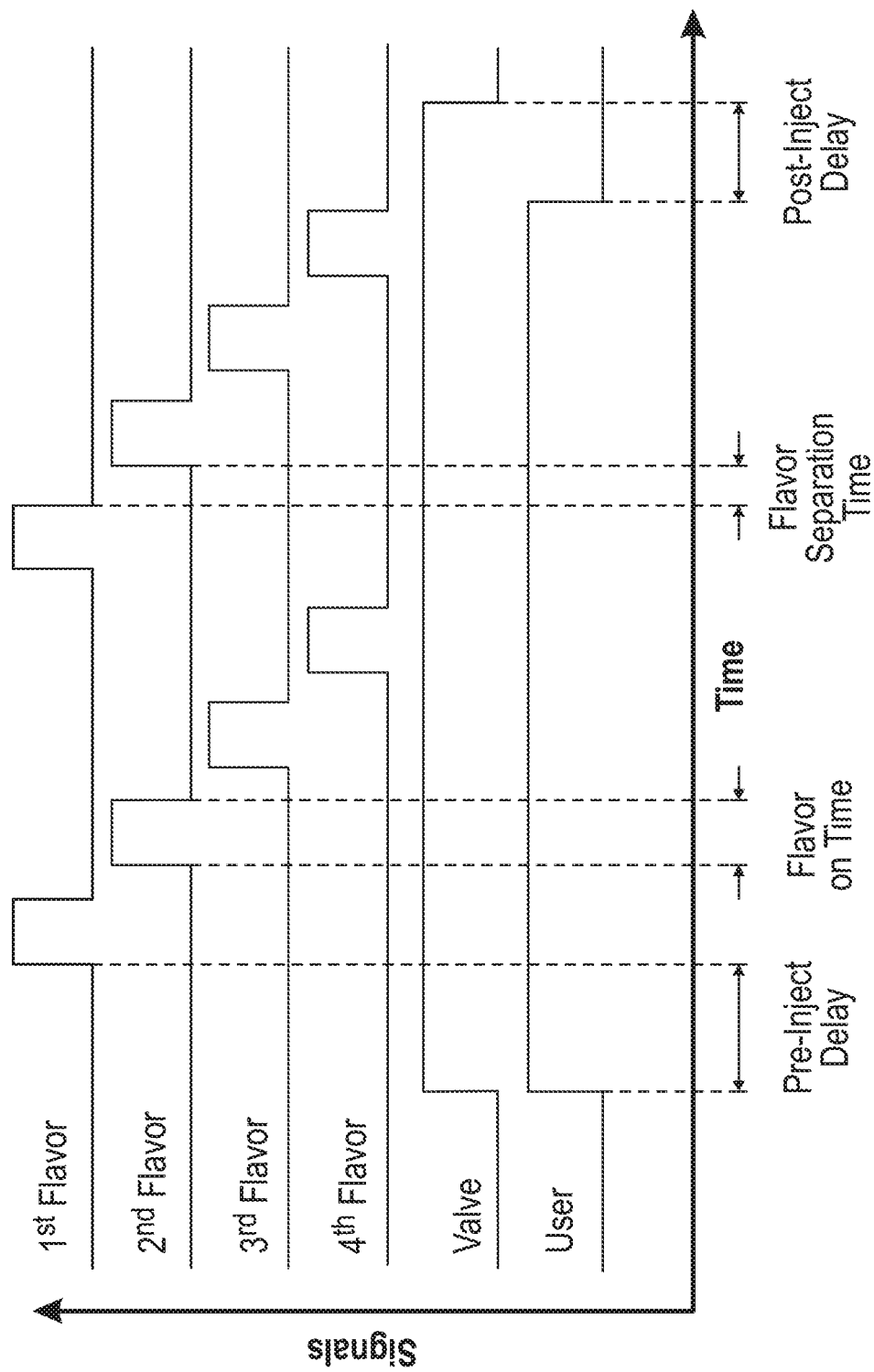
FIG. 12 is a chart illustrating methods of dispensing flavors into beverages in accordance with certain teachings disclosed herein.
Figure 13:
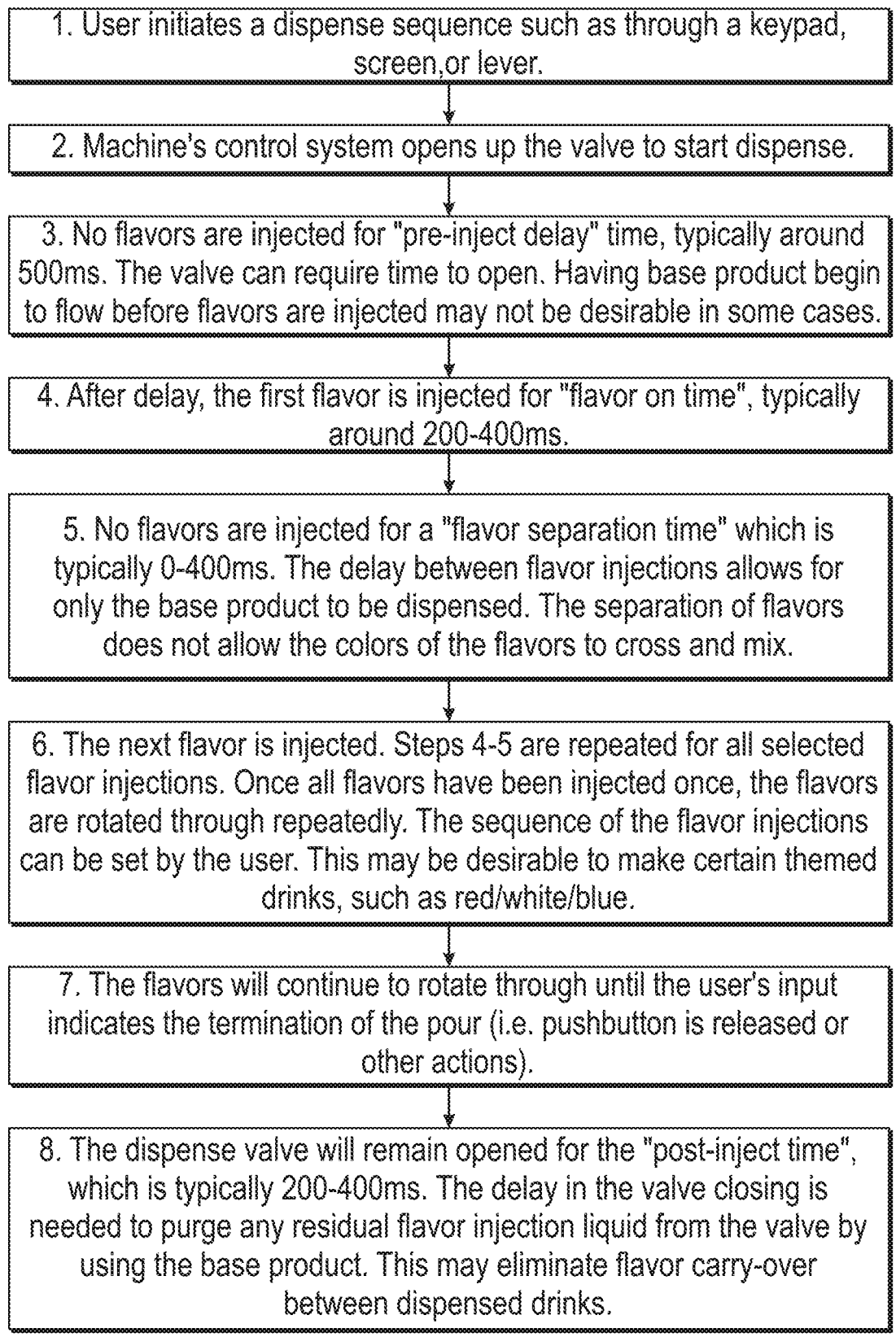
FIG. 13 is a flow chart illustrating methods of dispensing flavors into beverages in accordance with certain teachings disclosed herein.

FIGS. 12 and 13 may be used to illustrate one embodiment of the inventions disclosed herein. In this exemplary embodiment, a dispenser with four (4) injectors may be utilized to produce a desired frozen drink.

In FIG. 12, the "Signals" axis (vertical) indicates when an action is taking place. If no action is happening for a specific object, then the bold line associated with the object will be below the object label. If an action is taking place, the bold line associated with the object will be above the object label. For example, the object "User" in the figure may be a person who desires a frozen beverage. The action for the User is to select a drink and press a button or activate a mechanism that will dispense the beverage. Therefore, the bold line associated with the User is low until the User activates the dispensing of the drink. When the User presses the button, or takes other actions to dispense the drink, the bold line is raised above the label. When the User no longer wishes the drink to be dispensed, he stops the action, which is reflected in the figure by the line moving back below the label "User". The "Valve" and each "Flavor" indicate that these objects are similarly active or inactive; however, their actions may be determined by solenoids or other means in response to the actions of the "User". The horizontal axis of the figure represents time moving forward.

In FIG. 12, a User may select a drink through any means such as by pressing buttons, or by making a selection on an input device, or any other means. This action starts the dispensing of the base product as shown by the action of the Valve. The Valve will open to allow the base product to be dispensed from the barrel, through the dispense path, and out the dispensing nozzle. In one embodiment, the action may be performed by the User raising a lever to physically open a valve. In another embodiment, the User may be dissociated from the actual action because the process is automated after the User makes a selection of a drink.

FIG. 13 lists the steps associated with the exemplary dispensing of a drink shown in FIG. 12. The methods of utilizing the inventions disclosed herein are not limited by the examples depicted in FIGS. 12 and 13. In other embodiments, the "flavor ON time" may be much longer. In one envisioned embodiment, if two flavors are chosen for a half-and-half drink where the top half is one flavor and the bottom half is the other flavor, then the first flavor injector may be activated for approximately half of the time to dispense the drink, and the second flavor injector activated for approximately the remaining time to dispense the drink.

The "Pre-Inject Delay", the "Flavor Separation Time" and the "Post-Inject Delay" may still be used in this embodiment.

Some of the embodiments disclosed herein have exemplified the flavor injectors having states of on and off. Such does not have to be the case with certain flavor injectors such as those that utilize solenoids or other means that may fully or partially open and close an injector. Another alternative embodiment of a blended drink containing two or more flavors would be to simultaneously activate all of the flavor injectors but have each of them inject at less than 100% of their capacity. In an exemplary case of a blended drink containing two flavors, each flavor injector may run at 50% of their respective capacities.

The "Pre-Inject Delay" and the "Post-Inject Delay" are preferable for several implementations. However, in some situations, they may be omitted. One such case is where one or more flavor ingredients are added before dispensing the base product. Another is where one or more flavor ingredients are added after dispensing of the base product has stopped. The latter case may be seen as a topping.

In another embodiment, a consumer of a beverage may desire to have some ingredients at separate layers and other ingredients mixed. This may be achieved by a method of injecting the single flavor substances in a manner described in FIG. 12 in that each is added individually with a Flavor Separation Time between them. When a blend is to be added, each of the injectors participating in the blend will be opened at a percentage commensurate with the number of flavor substances, for a time period desired. Another Flavor Separation Time may be after that, if another subsequent flavor layer is desired. As an example, a consumer may desire a layer of cherry, a layer of a blend of lemon and lime, and then a layer of grape. These layers will be delivered into a receptacle in that order and thusly from the bottom to the top. If the consumer would like them from the top to the bottom, the device can reverse the order. Similar to the delivery of flavors in FIG. 12, a layer of cherry as the first flavor will be delivered with the cherry injector open at 100% capacity. After that has finished, and after the Flavor Separation Time, both the lemon and the lime injectors may open at 50% capacity. After that finishes, and after another Flavor Separation Time, the grape injector will open at 100% capacity.

An alternative embodiment would be where the lemon injector will pulse open then closed, and the lime injector will pulse open then closed. In each pulse, each injector may be open at 100% capacity for a short period of time, or at a lesser capacity for a longer period of time. In one embodiment, their open times will not overlap. In another embodiment, their open times may overlap. In another embodiment, their closed time will not overlap. And in yet another embodiment, their closed time may overlap.

In some multiflavor drink dispensers, the flavor profiles of the flavor ingredients may be of different strengths. That is to say that one flavor ingredient in its raw state may have a highly distinctive and powerful taste and aroma, whereas another flavor ingredient may have a comparatively weaker profile. In those cases, it may be preferred to dispense smaller amounts of the more powerful flavor ingredient compared to the flavor ingredient with the weaker profile to obtain desirable characteristics of each. To maintain flavor layers with such desirable characteristics, the duty cycle of the solenoid of the flavor injector of the more powerful flavor ingredient may be reduced during its Flavor ON Time. Similarly, the duty cycle of the weaker flavor injector may be comparatively more open. In other words, the Flavor ON time may be varied for each flavor, or type of flavor, used when dispensing a drink.

Applicants have also found that substances other than flavor ingredients may be injected into a base product in ways that are similar to injecting flavor ingredients. Examples of other substances include, but are not limited to sweeteners, substances to make a drink more savory, substances to make a drink more tart or sour, substances to make a drink taste more salty, and substances to make a drink more bitter. Additionally, applicants have found ways to inject other fluids such as alcohol and fluids containing alcohol into drinks. These may be mixed with a base product to make a drink, or they may be mixed together, without a base product, to make a drink. The injection of these other substances may be done through the same methods as described for injecting flavor substances, or they may be injected through other methods also invented by the applicants.

Any flavor on the machine can be either a standard flavor or a streaming ingredient. The machine may be configured through the user interface, or a technician may set up the machine, or the machine may be configured at the factory.

Figure 14:
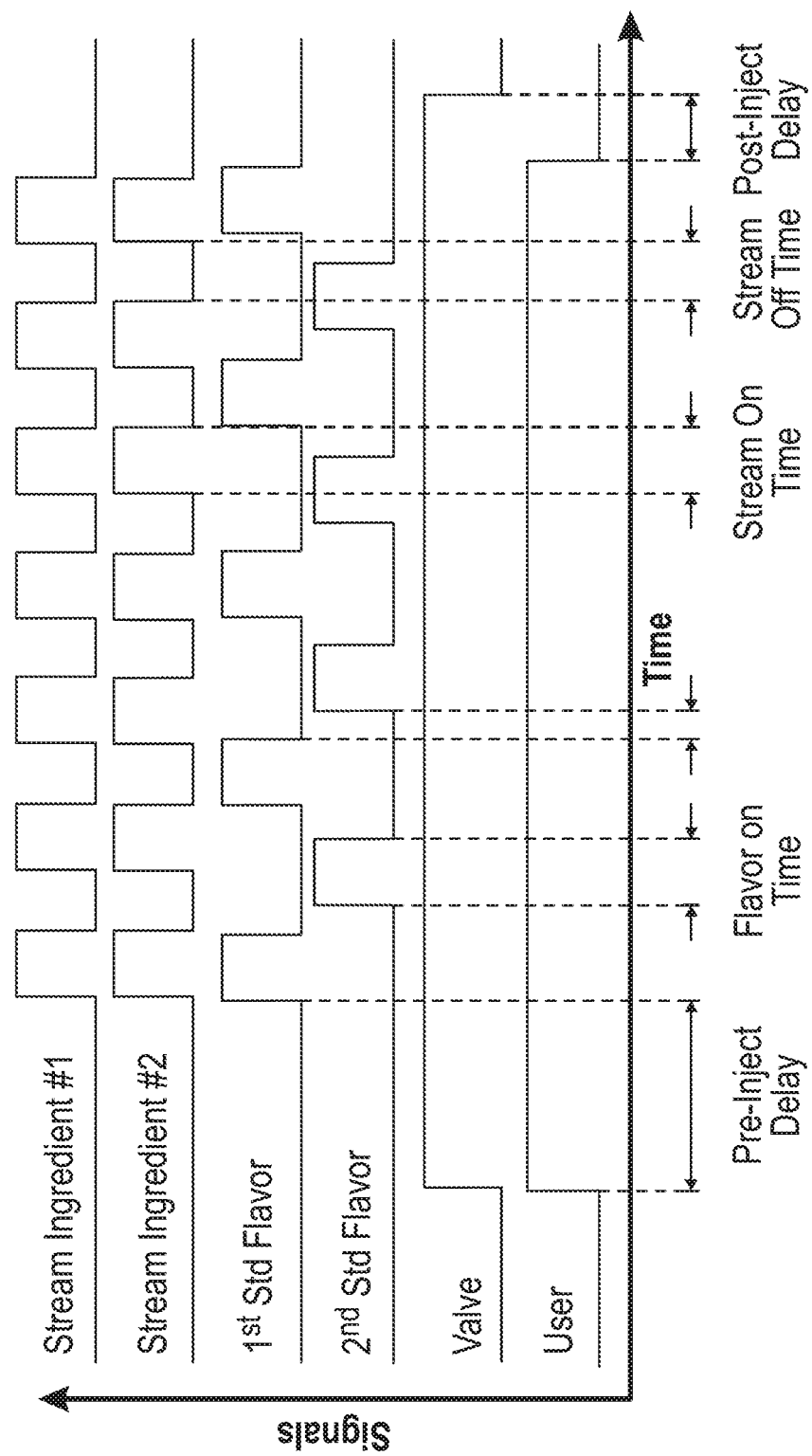
FIG. 14 is a chart illustrating methods of dispensing flavors into beverages in accordance with certain teachings disclosed herein.

In one of many possible embodiments of the inventions disclosed herein, a flavored and sweetened tea may be made as depicted in the chart in FIG. 14. The User may select the ingredients through any number of means including push buttons, a human interface device, or any number of other ways. In this exemplary embodiment, the drink dispenser will dispense unsweetened, unflavored tea through the valve when it is opened. A first standard flavor may be peach, and a second may be strawberry. A first stream ingredient may be a solution of cane sugar, and the second stream ingredient may be a solution of stevia or an artificial sweetener. The User may activate the dispense of the flavored and sweetened tea by pressing a button or activating another mechanism. This will activate the valve to dispense the unsweetened, unflavored tea from the barrel. After a Pre-Inject Delay, injectors will then begin injecting the stream ingredients in synchronized pulses. The flavor ingredients will be alternately pulsed with periods where both will be active and inactive. At the end of dispensing, a Post-Inject Delay will continue dispensing the unsweetened, unflavored tea through the valve.

Injecting stream ingredients in this way may be seen as a way of adding small portions of an ingredient during the entire dispense cycle to produce a more pleasing drink. In the example previously presented, the stream ingredients will be thoroughly mixed within the drink when the dispense stops so that a consumer will have a consistent flavor profile throughout the drink and will not have to stir the drink before consuming it.

The "Stream ON Time and "Stream OFF Time" may be either constant values, or values relative to each other depending on the flavor types, or calculated using an equation.

This example shows equal portions of the cane sugar and the stevia being dispensed to provide a sweetened drink with fewer calories than if the drink were made with only cane sugar. In one embodiment, changing the rates of injection by not opening an injector 100%, or changing the number of pulses during the dispense cycle may be used to provide a drink with a known number of calories. For example, if a User wants a drink with 200 calories, the cane sugar injector will be activated a number of times and at a known rate to deliver a solution of cane sugar that will account for 200 calories in the dispensed drink. On the other hand, if a User wants a drink with 50 calories, a known amount of stevia will be injected rather than the full amount of cane sugar with the results being a drink with the same sweetness but having only 50 calories rather than 200. In a similar way in this example, the User may select that the tea will be more disposed towards peach than towards strawberry, wherein the injection of the standard flavors may be altered to produce desired results.

Another embodiment may be to produce a frozen or unfrozen drink with alcohol. An exemplary embodiment of this may be the dispensing of a piña colada. In this example, the base produce may be an unfrozen pineapple juice, a standard flavor may be coconut milk, and a streamed ingredient may be rum. The pineapple juice and coconut milk may be mixed at constant proportions to produce a desirable taste profile. The rum may be streamed into the dispense path at such times and in such as rate as to produce a drink with a known amount of alcohol by volume (ABV). Similarly, a frozen margarita may be made with the base product of frozen lime juice as a base product, with streamed ingredients of tequila and triple sec. Even with two streamed ingredients containing alcohol, a specified ABV of the drink may be achieved by meting out portions of the streamed ingredients through the use of the timed injections and capacity regulation techniques as disclosed and taught herein. In this, the streamed ingredients of tequila and triple sec may be injected in apportioned amounts to achieve a desirable flavor profile of two parts of tequila to one part of triple sec.

Figure 15:
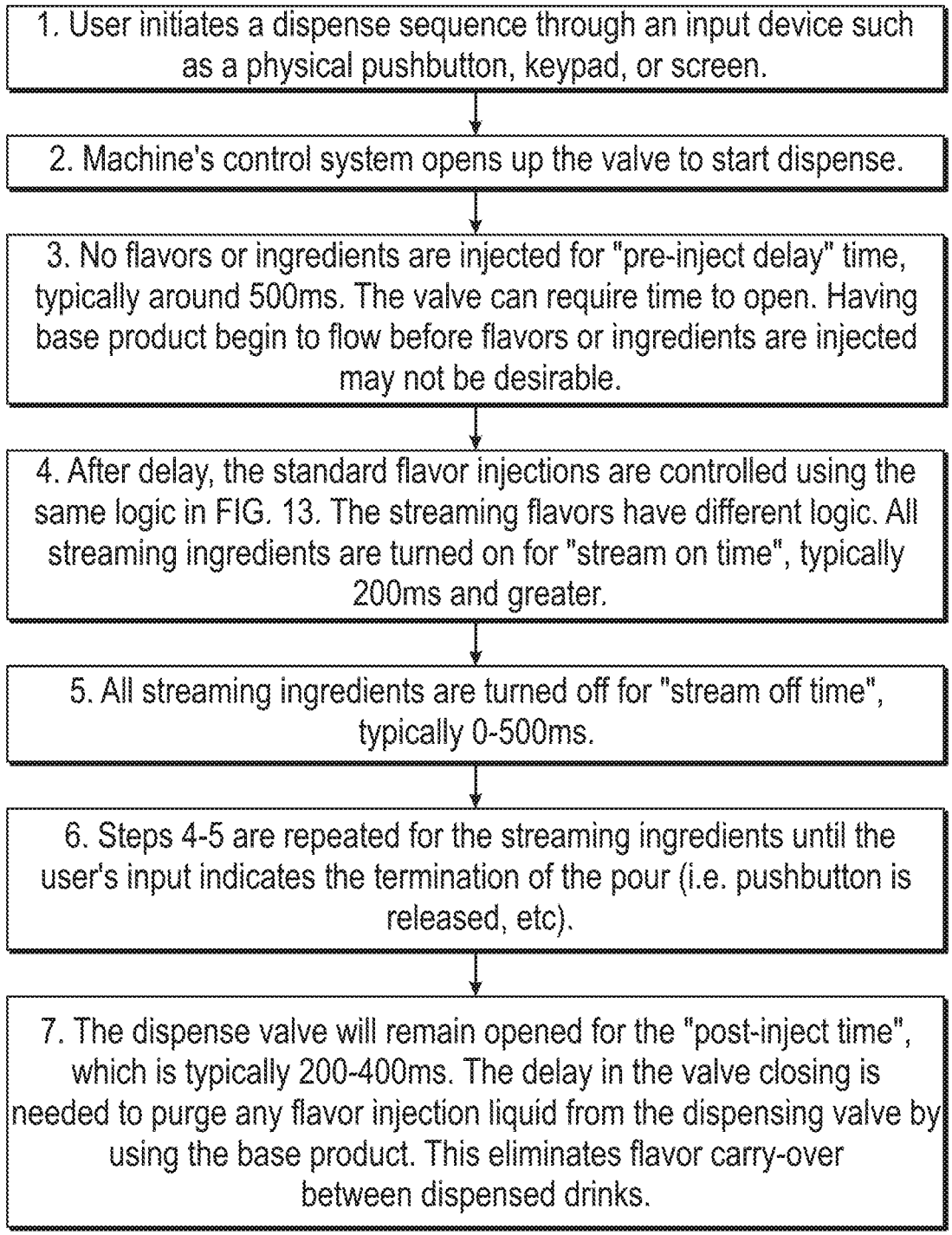
FIG. 15 is a flow chart illustrating methods of dispensing flavors into beverages in accordance with certain teachings disclosed herein.

FIG. 15 represents a flow chart depicting one embodiment of a method to dispense a drink with multiple flavor ingredients and multiple stream ingredients along with a base product.

One embodiment of a method disclosed herein may be to set the "Stream ON Time" and "Stream OFF Time" to constant values. One example is a tea as the base product with a streaming sweetener ingredient. The streaming ingredient may be calibrated to be ON at 100% duty cycle, resulting in a "Stream OFF Time" of 0. Or, the stream ingredient may be required to operate at a desired duty cycle, such as 35% capacity. In this case, the ON and OFF times are set accordingly.

Another embodiment is to calculate the ON/OFF times based on the following:

$T_{period}$="Stream ON Time"+"Stream OFF Time"

"Stream ON Time"=$T_{period}$/(Number of Total Pulsing Stream Ingredients)

"Stream OFF Time"=$T_{period}$−"Stream ON Time"

In this exemplary embodiment, the period of the stream pulsing, $T_{period}$, may be set to a constant value, such as 500 ms. The duty cycle of the streaming ingredients may be equal to 1/(Number of Total Pulsing Stream Ingredients). If injecting one stream, the duty cycle may be 100%. If injecting two streams, the duty cycle may be 50%. This embodiment is useful for controlling the total amount of injected streaming ingredient. This may be used to control caloric content, ABV (alcohol by volume), or any number of other factors. If the density of the alcohol product is known, then it may be used to calculate the alcohol by weight (ABW).

Another embodiment is that streaming ingredients may be injected out of pulsing phase with each other instead of in phase. In this embodiment, the phase shift may be equal to 360°/(Number of Total Pulsing Stream Ingredients). When pulsing two streaming ingredients, they may be 180° out of phase. Three ingredients may be out of phase by 120° from each other. This embodiment is especially useful whenever the duty cycle is also a function of the number of pulsing ingredients. If the duty cycle was equal to 100%/(Number of Total Pulsing Stream Ingredients), then none of the streams would overlap and the cumulative injection flowrate over time would be equal to that of one stream regardless if multiple streams were injected. This method may allow caloric and/or alcohol content to be controlled as well as controlling that some streaming ingredients be kept out of phase and not overlap during injection. However, in some embodiments it may be desired to have 0° phase shift between streaming injections when wanting to inject the same amount of each stream and to have them injected at the same time. Applicants have found benefit in certain cases by having 0° phase shift between streaming injections with out of phase standard injections as depicted in FIG. 14.

Anywhere from one to all flavor injections may be streaming to produce drinks having desirable characteristics such as, but not limited to, alcohol content, a number of calories, and/or a flavor profile.

Applicants have created methods and apparatuses to calibrate the relative quantities of flavor substance and base mixture that are dispensed.

Applicants have found that a determination and calibration of the portions may be found through a process of first dispensing the base product into a container, then dispensing the flavor substance into a second container. Each container will be weighed when it is initially empty, then again when it has been filled to find the weights of the samples dispensed. Knowing the times that each substance was allowed to be dispensed, along with the densities of the base product and each flavor substance may then yield the proportions of the base product and the flavor substance by weight and by volume. This may be exemplified in FIG. 11.

Figure 11:
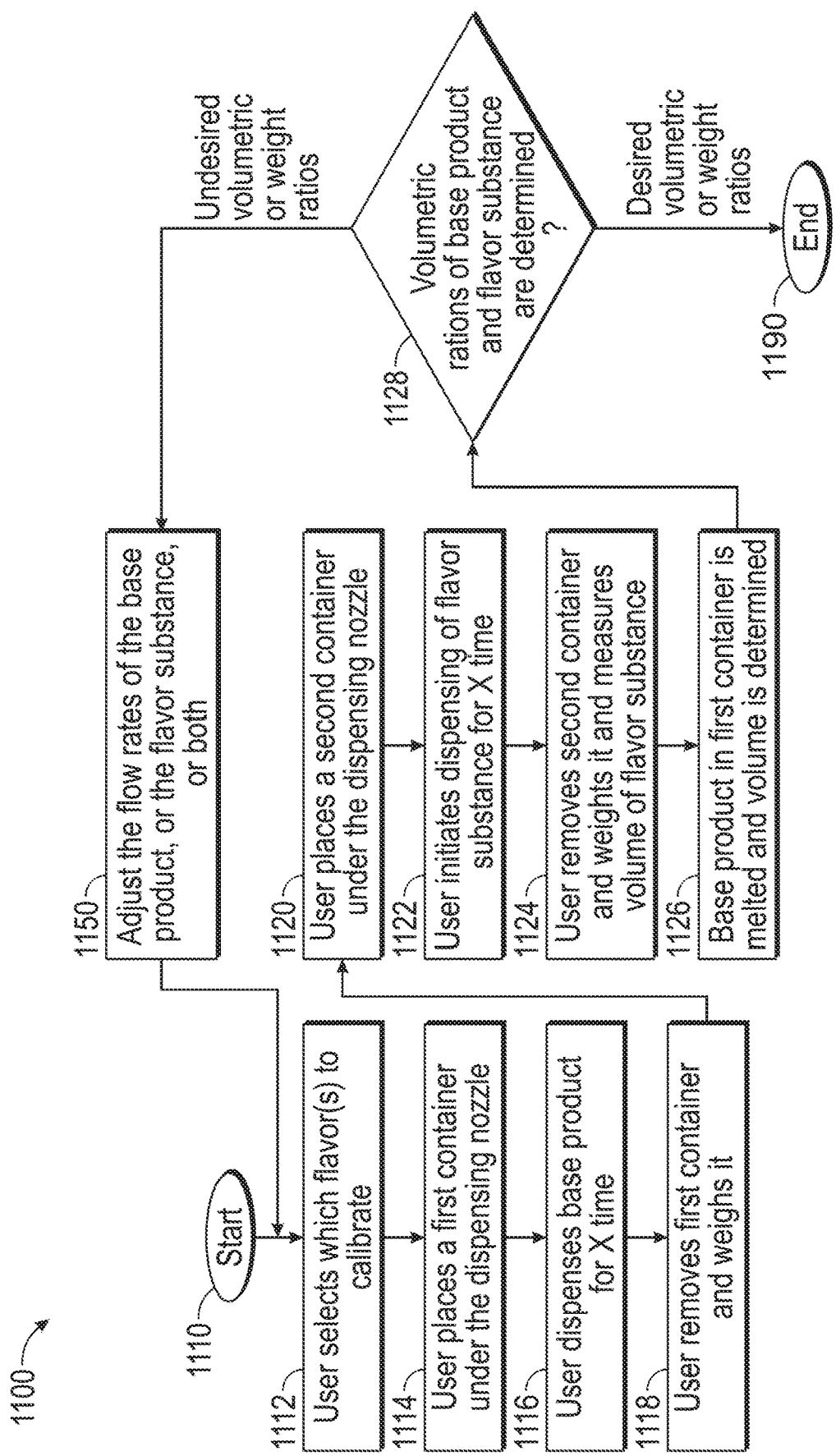
FIG. 11 is a flow chart illustrating an embodiment of measuring and calibrating relative portions of dispensed ingredients in accordance with certain teachings disclosed herein.

FIG. 11 is a process 1100 that starts 1110 with the initialization of variables and timers that may be used. Step 1112 involves a user, typically a technician or someone who oversees the device, initiating the calibration process by selecting the flavor to calibrate. This may be done in any number of ways but a preferred embodiment is of the user making this selection in a user interface such as a touch screen, or other human interface device. Other methods that may be used to start this process and input selections may be through a keyboard with screen, software on portable computers with associated input mechanisms, software on remote computers with associated networking connections, or any number of other input devices and methods.

Step 1112 involves the selection of which flavor or flavors to calibrate. This may be a single flavor but may be multiple flavors calibrated simultaneously. For the latter, it may be desirable in some cases to have multiple flavors mixed to deliver a preferred flavor profile so they should be calibrated together rather than individually. One example of this may be that a mixture of grape and bubble gum flavors would have a preferred mixing ratio of 30% grape and 70% bubble gum, whereas a preferred mixture of orange and bubble gum would have a mixing ratio of 50% orange and 50% bubble gum.

Once the selection of a flavor or flavors has been made, the user places a container under the dispensing nozzle as described in step 1114. The container may be a beverage container normally used by consumers, a container made specifically for this calibration, or any other container suitable for containing a portion of dispensed products from the device. In a preferred embodiment, the tare weight of the container will be known, but if it is not, it may be determined before the calibration process by separately weighing the container when it is empty.

Step 1116 involves dispensing the base product for a known amount of time. This time, represented as "X" in step 1116, may be referenced as the calibration time $T_c$. Applicants have found that this may be done by having the user interact with the device through the user interface. In one of many possible embodiments, the user interface may prompt the user to press a button when a container has been properly placed below the dispensing nozzle. Other embodiments may be envisioned by those skilled in the art without departing from the inventions disclosed herein.

The base product dispensed may be in a frozen and aerated state similar to frozen foam. In one embodiment where the volumes are related, the user may level the amount of base product dispensed by tamping it down by forcibly dropping the container on a level surface. In the preferred embodiment where the weights are related, the container and the dispensed frozen base are weighed as shown in step 1118.

Step 1120 involves the user placing a second container under the dispensing nozzle. Step 1122 involves the user dispensing the selected flavor substance, or substances, for the same calibration time $T_c$ as was used in step 1116. Step 1124 involves the user removing the second container and weighing it and measuring the volume.

In a preferred embodiment, the calibration time $T_c$ may be three (3) seconds. Applicants have found that this amount of time is sufficient to accurately calibrate the relative amounts of product while not being wasteful. In other envisioned embodiments, the calibration times of each component may be different and the relative proportions calculated using those times. As an example, there may be a flavor substance that has a very strong flavor profile. In this case, a very small amount of that flavor substance may be dispensed with a normal amount of base product to produce a desirable product. From that, a calibration of the components may involve the base product being dispensed for three (3) seconds, but the flavor substance being dispensed for ten (10) seconds to obtain an accurate reading that overcomes or minimizes an error of measurement.

Obtaining a volumetric ratio of frozen base product to flavor substance may be determined at this point by comparing the ascertained volumes in the first and second containers. Finding this volumetric ratio may be preferred in some cases. Similarly, a weight comparison may be obtained at this time by comparing the weights of the products in the first and second containers. Applicants have found that a volumetric ratio of the liquid base product and the liquid flavor substance may also be determined by melting the base product in the first container as shown in step 1126.

If the volumetric ratio is not going to be determined from the weights of the base product and flavor substance, then the weighing the containers in steps 1118 and 1124 need not be performed.

Processing then moves to step 1128 where a determination is made about the ratios of products that have been dispensed. Step 1128 illustrates a decision about volumetric ratios, but other ratios such as weight, may be determined in this step. The following equations may be used to determine a volumetric ratio.

$T_c$=Calibration Time, in seconds $V_{flavor,Tc}$=Volume of flavor substance when dispensed for $T_c$ time, in fluid ounces $V_{base,Tc}$=Volume of base product when dispensed for $T_c$ time, in fluid ounces Volumetric Ratio=$V_{flavor,Tc}/(V_{flavor,Tc}+V_{base,Tc})$ In some situations, using cubic centimeters rather than fluid ounces may be preferable.

A Weight Ratio may be determined in a similar manner by using the weights of the dispensed flavor substance and base product. This may be converted to volumetric ratios using the density of each substance as in the following equations.

$W_{flavor,Tc}$=Weight of flavor substance when dispensed for $T_c$ time, in grams $W_{base,Tc}$=Weight of base product when dispensed for $T_c$ time, in grams $\rho_{flavor}$=Density of flavor substance, in grams per fluid ounce $\rho_{base}$=Density of base product, in grams per fluid ounce $V_{base,Tc}=W_{base,Tc}/\rho_{base}$ in fluid ounces $V_{flavor,Tc}=W_{flavor,Tc}/\rho_{flavor}$ in fluid ounces Volumetric Ratio=$(W_{flavor,Tc}/\rho_{flavor})/((W_{base,Tc}/\rho_{base})+(W_{flavor,Tc}/\rho_{flavor}))$ If the Volumetric Ratio is within a range that is desirable in step 1128, processing ends at step 1190. This may be where the desired Volumetric Ratio is 0.10 and the measured Volumetric Ratio is between 0.09 and 0.11. Other relative error factors may be used without deviating from the inventions disclosed herein.

A preferred embodiment is to use exact Volumetric Ratios obtained from exact measurements to make adjustments to the volumes dispensed by the beverage dispenser. However, the resolution of the measure of the volume may introduce an inaccuracy; such as if a technician is measuring the lip rather than the meniscus of a liquid in a container, or other parallax errors. To account for this, some tolerance may be instituted in determining if adjustments are warranted. As an example, it may be that a technician reading the volume in a container may only do so with an accuracy of +/−3%. From that, if the measures entered show that an adjustment of 2% needs to be made to the output of a flavor substance, a decision may be made to not make that adjustment.

In some situations, it may be more understandable to express a Volumetric Ratio Percent which is the Volumetric Ratio multiplied by 100, such that a Volumetric Ratio of 0.10 is a Volumetric Ratio Percent of 10%.

In other situations, it may be more understandable to express a Parts Ratio. This may be the parts of volume of the base product related to the parts of volume of the flavor substance. An example of this may be where there are five (5) parts of base product to one (1) part of flavor substance. This may be referred to as having a 5-to-1 parts ratio, and may sometimes be written as "5:1".

If a desired Volumetric Ratio is not met in step 1128, processing will proceed to step 1150. This may be because the Volumetric Ratio was found to be 0.12 but the desired range was between 0.09 and 0.11.

Step 1150 allows the user to make adjustments to the dispensed ingredients. In one embodiment, the user may manually adjust the dispensing valves to allow more or less frozen base product to be dispensed while being operated. Alternatively, the user may adjust the flavor substance flow controls to achieve a desired proportion of base product to flavor substance in a dispensed beverage. In another embodiment, the user would enter the resulting volumes or weights directly into the device through the user interface and the device would make any necessary adjustments to the amounts dispensed. Once the appropriate adjustments have been made, processing returns to step 1112 in process 1100. Process 1100 may be iterated until the desired volumetric or weight ratio is obtained.

Applicants have also invented an alternative embodiment to this process using mechanisms within the device. In this embodiment, valves may be deployed wherein the flavor substance and the base product are diverted into separate chambers during the calibration process. Each of the separate chambers may have a mechanism to measure the contained volume, the contained weight, or the contained mass, or any combination including all at once. After the calibration ratio (or ratios) has been performed, the device may make its own adjustments, or may indicate to the user through the user interface what adjustments need to be made.

In another envisioned embodiment, the amounts of flavor substance and base product dispensed may be determined through the use of sensors built into or added on to the device. As one example, it may be desirable to measure the amount of liquid dispensed through the use of flow meters in the dispense path. Alternatively, the amount of a liquid added to a container under the dispense nozzle may be determined through the use of distance measuring devices such as a laser. In this embodiment, a laser or other light emitting device mounted adjacent to the dispensing nozzle would be able to send pulses downwards that would be reflected from the surface of the liquid in the container into a sensor. By knowing the speed of the pulses, the distance from the emitting device to the surface and then to the sensor may be determined. By calibration, the volume of a liquid in a container based upon these measurements may be obtained. Other methods of determining a volume in a container through the use of sensors may be utilized in this envisioned embodiment without departing from the inventions disclosed herein.

In another envisioned embodiment, a weight measuring device may be incorporated into the frozen beverage dispensing device. In this envisioned embodiment, the user would place a container upon the weight measuring device, such as a screen or other suitable platform below the dispensing nozzle, and dispense the flavor substance and the base product in turn for specified times as described previously to obtain a weight ratio. An alternative to this would be to dispense each ingredient in turn until a specific weight was delivered. In that case, the times recorded for delivering each ingredient may be compared to determine a weight ratio.

In yet another envisioned embodiment, the container for holding the flavor substance within the frozen beverage dispensing device may be a weight measuring device in itself. Then, the flavor substance container within the frozen beverage dispensing device would be able to detail the weight of flavor substance dispensed after each dispending operation. This would not only be useful in the calibration process as described herein, but would also benefit the owner of the device in that it may send an alert when a specific flavor substance is running low.

In some situations, a frozen beverage dispenser may be used to dispense frozen un-carbonated beverages. One method of accomplishing this may be done by having only liquid ingredients in the barrel and maintaining a pressure in the barrel to be between 5 and 6 psi above ambient atmospheric pressure by using a system to pressurize the barrel such as is described in U.S. Patent Application Publication 20160245573, which is herein incorporated by reference. In this, a frozen beverage machine may have a mechanical regulator providing gas to an active charge system. The active charge system applies pressure to an expansion tank connected to the barrel thereby regulating the pressure in the barrel. In other situations, a frozen beverage dispenser may be used to dispense frozen low-carbonated beverages where some amount of carbon dioxide may be in the barrel along with the liquid ingredients. This may, or may not, use an active charge system and expansion tank.

In some beverages that contain gas, carbon dioxide may be used as that may be convenient to the operation of the frozen beverage dispenser, but the inventions disclosed herein are not dependent upon or limited to carbon dioxide. Other gases may be used including, but not limited to other inert gases, some non-inert gases, and even air. In some cases, it may be more desirable to use an inert gas to prevent oxidation of the contents in the barrel.

Typically, a refill system is timed to monitor the pressure in the barrel to between 200 to 800 milliseconds. The pressure in the barrel will fluctuate between the low pressure set point and the high pressure set point, with ingredients being added when the pressure reaches or goes below the low pressure set point until the high pressure set point is reached. The low pressure set point may be called the Refill Pressure, and the high pressure set point may be called the Full Pressure. The ingredients are liquids for an un-carbonated product, and a carbonated product may have carbon dioxide as an additional ingredient.

Applicants have noted that the pour of a frozen un-carbonated beverage may have an initial full stream that tapers off momentarily before regaining a full stream. The initial brief hesitation, or even a stop of flow, may be due to the pressure decreasing within the barrel at the start of a dispense so that the fluid is not pushed out, until the controller again monitors the pressure in the barrel and initiates the process to add more ingredients, or by adding pressure through the active charge system. This may be because the pressure refill system is not reacting fast enough to increase the pressure within the barrel during the dispense. Then, as the pressure is adjusted, a steady and desirable flow is resumed. This may or may not be observed in dispensing frozen carbonated beverages since the pressure in the barrels of those systems may be sufficient to not noticeably hesitate during the dispense. However, to ensure a consistent pour, the inventions disclosed herein may be applied to frozen carbonated beverage dispensers.

Applicants have created methods and apparatuses to maintain a consistent pour of a beverage from a frozen beverage dispenser while utilizing it to dispense a frozen un-carbonated beverage.

FIGS. 16 and 17 illustrate a method to overcome the hesitant dispense of a beverage. In FIG. 16, the upper portion of the chart shows the pressure limit set points within the barrel along a time axis. The lower line represents the Refill Pressure. If the pressure in the barrel falls below this set point, the controller will add more ingredients. The upper line represents the Full Pressure set point. The controller will stop adding ingredients when the pressure reaches this set point. The lower portion of the chart illustrates the assertion of a signal during a dispense. When there is no dispensing, the line remains low and no signal is sent. When dispensing is occurring, the line is raised and a signal is sent that the dispenser is dispensing.

FIG. 17 represents one of many possible embodiments of a sequence of steps that may be used to produce a consistent stream during the dispense. In step 1 of FIG. 17, a user may activate a signal in the beverage dispenser that the dispense action has been initiated. This is shown as the line in the lower portion of FIG. 16 moving from the state of not sending a signal (low), to the state of sending a signal (high.) The controller receives the signal in step 2 of FIG. 17, and will raise the set points. This is seen in FIG. 16 as when the upper and lower lines in the upper portion of the figure are raised. In one embodiment, the new set point pressures are 18 psi for the Raised Refill Pressure, and 20 psi for the Raised Full Pressure. In one embodiment, when the controller sets these new set points, the controller may interrupt the normal cycle of monitoring the pressure in the barrel, and immediately check the pressure in the barrel. Since the pressure was being maintained at between much lower set points, ingredients will be injected into the barrel and will assist in pushing the product out through the flow path without any hesitation. Other pressures may also be suitable for the raised set point pressures.

In another embodiment, raising the set points when the dispense signal is received by the controller may not immediately trigger an injection of ingredients. However, the Raised-Pressure Time may be long enough in this embodiment for the normal cycle of checking the pressure in the barrel to activate.

Inventors have found that the time allotted to the Raised-Pressure Time may be influenced by the sampling speed of the associated electronics, the response time of the pressure transducer, the mechanical response time of the fill system, and the response time of the dispensing valve. Other factors may also be associated with determining a Raised-Pressure Time value.

In step 3 of FIG. 17, the Raised-Pressure Time is set and monitored. During this time, the set point pressures are maintained in a raised state. Inventors have found that a Raised-Pressure Time of between 1 and 4 seconds for a normal dispense of a beverage is sufficient for the injection of gas into the barrel to overcome the initial hesitation of the dispense.

In one embodiment, the pressure in the barrel will rise to the Raised Full Point during the Raised-Pressure Time. When that happens, the flow of the ingredients may be stopped until the pressure declines below the Raised Refill Pressure. In another embodiment, the pressure in the barrel may not rise to the Raised Full Pressure during the Raised-Pressure Time but ingredients will be injected throughout that time, until the time when the set points are lowered at the end of the Raised-Pressure Time.

Step 4 in FIG. 17 is to return the pressure set points to their normal points. In one embodiment as is seen in FIG. 16, this may be done before the Dispense Time has elapsed. That is to say that the set points are returned to normal before dispensing has completed. In another embodiment, the Raised-Pressure Time may be substantially equal to the Dispense Time. In the case where a barrel contains some gas, such as for a frozen carbonated beverage, having the Raised-Pressure Time extend beyond the Dispense Time may allow the gas to interact in undesirable ways with the fluid in the barrel. For example if the gas is carbon dioxide, having some time of high pressure after dispense has completed may over carbonate the beverage. However, in another embodiment, such interaction may be desirable for this or other reasons.

In some cases, it may be desirable to coordinate the Raised-Pressure Time with other operations in the beverage dispenser. As an example, if there is a concern that the high pressure of carbon dioxide within the barrel may unwantedly carbonate the beverage contained in it, it may be desirable to stop the beater bar during this time period. Without the action of the beater bar, the beverage may absorb less carbon dioxide during this time. Other operations that may maintain the quality and other desirable characteristics of the beverage may be coordinated with the Raised-Pressure Time as well.

In another embodiment, the Dispense Time may be less that what is expected. In the example noted before, a Raised-Pressure Time of between 1 and 4 seconds may be sufficient to dispense the drink in a preferred manner. However, this may not be desired if the dispense is terminated before an expected dispense time has passed. In one embodiment, if the dispense ends before the desired Raised-Pressure Time has expired, the set points may be immediately returned to their normal set points. In this, the controller may determine that the pressure in the barrel may be too high to maintain a desirable quality for the beverage in the barrel, and may elect to vent some of the gas from the active charge system to quickly reduce the pressure to the Full Pressure set point. In another envisioned embodiment, the pressure may be allowed to remain at that point.

In an envisioned embodiment, a user may maliciously or inadvertently attempt to change the characteristics of the beverage within the barrel by quickly turning on and off the dispense activator. If this were not controlled, the pressure within the barrel may stay in a raised state for longer than desired. Instructions within the controller may be provided to disallow this behavior by limiting the number of times that the set points may be raised during any time interval. In another embodiment, the Raise-Pressure Time may be set to a long period, such as, for example, 15 to 30 seconds, and more specifically, about 20 seconds. A longer Raise-Pressure time may be desired if the sensed barrel pressure is not accurate or is suspect during a dispense event. A similar embodiment involves setting the Raised Refill Pressure and/or Raised Full Pressure to a large value. For example, and not limitation, the Raised Refill and Raised Full pressures may be set to 45 psi and 50 psi, respectively. Higher Raised pressures may be desirable if the sensed barrel pressure is not accurate during a dispense event. In the event that the barrel pressure is unknown, the control logic may control the refill based on the dispense signal, and pressure may be ignored.

In some frozen beverage machines, the pressure sensors may not be accurate, or may not be accurately representing the difference from the atmospheric pressure. Applicants have noted that some mechanical pressure regulators may drift by as much as about 10 psi higher than what is desired as a set point. In other frozen beverage dispensers, this behavior may not be due to inaccuracies in the mechanisms, but due to other characteristics of the dispenser. Some frozen beverage machines may have a mechanical regulator providing gas to an active charge system. The active charge system in turn applies pressure to an expansion tank connected to the barrel. The accuracy of the active charge system's mechanical regulator will directly reflect the pressure in the barrel. The barrel's internal pressure may increase up to the active charge system's pressure. As an example, if the Refill Pressure and Full Pressure set points are 5 and 6 psi respectively, the barrel pressure may be between 15 and 16 psi due to the active charge pressure. If the Raised Refill Pressure and Raised Full Pressure are set to points lower than these pressures then the correct action of injecting liquid when the dispense valve signal is received may not occur.

Applicants have invented methods and processes to overcome this behavior by anticipating this difference and setting the set points during the Raised-Pressure Time to be at points that are noticeably outside the range of inaccuracies. Continuing the above example, if the Refill Pressure and Full Pressure set points are at 5 and 6 psi, then the Raised Refill Pressure and Raised Full Pressure set points may be set at 18 and 20 psi, respectively. These points are well past the drift pressure maximum points of 15 and 16 psi and may then be properly acted upon.

Figure 18:
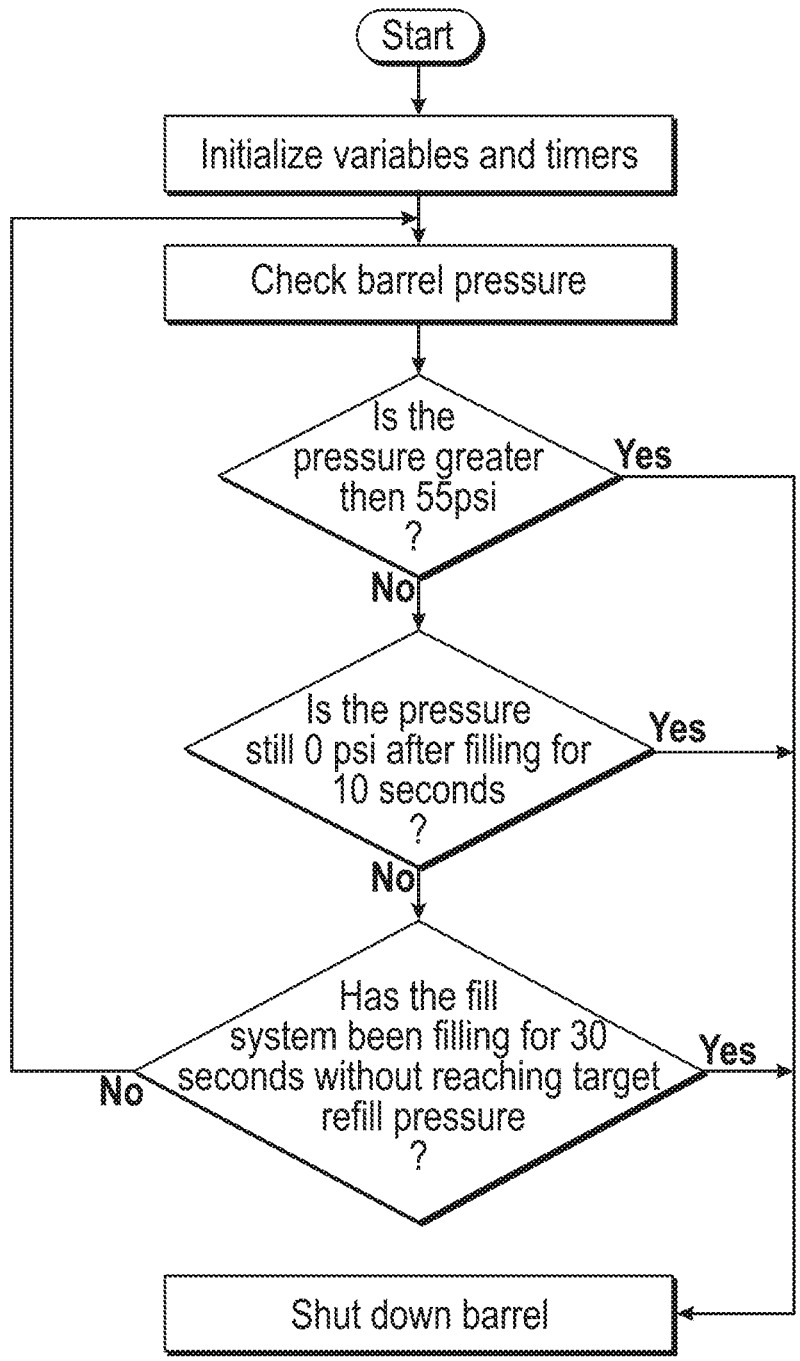
FIG. 18 is a flow chart illustrating methods for maintaining the pressure in a barrel in accordance with certain teachings herein.

While overcoming inaccuracies in measuring the pressure inside a barrel provides desirable outcomes, the Inventors provided restrictions so that the controller will not create conditions that may be unsafe or that may damage the beverage dispenser. An exemplary beverage dispenser may have a mechanical pressure relief valve for safety that will vent if the pressure inside the barrel reaches a point near the maximum pressure that the device can handle. As an example, if the maximum pressure of the barrel is rated at 65 psi, then a safety release valve may be set to release pressure at 55 psi. Even with this mechanical safety feature available, Applicants have invented methods to control the behavior of the dispensing machine. One embodiment of this may be seen in the flow chart in FIG. 18.

The process is designed to run in a loop after startup. The first step is to initialize the variables and timers. Once this is complete, the controller measures the pressure of the barrel then performs a series of tests to ensure that the regulation of the pressure is working within known and optimal conditions. The first test is to determine if the pressure exceeds a set maximum. In the exemplary embodiment where the maximum rated pressure of the device is 65 psi, this set point may be set at 55 psi. If the pressure exceeds this maximum pressure then the barrel will be shut down, which may entail opening the vent valve, closing the gas injection valve to the active charge system, closing the ingredient injection valve, stopping the beater motor, stopping refrigeration of the barrel, and other operations.

Another test that may be performed is to test that the pressure is still at or near atmospheric pressure after some amount of time filling the barrel. In one embodiment, it may be known that filling the barrel for 10 seconds even if there is very little beverage in the barrel should produce a pressure that is noticeably above atmospheric pressure. If that is not occurring then a leak or other problem may be causing a fault. A resulting action may be to shut down the barrel as described above.

Another test that may be performed is to test if the pressure has reached its target pressure, which may be the Full Pressure, within a set amount of time. In one embodiment, it may be known that filling the barrel for 30 seconds even if there is very little beverage in the barrel should produce a pressure close to, if not exceeding, the Full Pressure set point. If that is not occurring then a leak or other problem may be causing a fault. A resulting action may be to shut down the barrel as described above.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A beater bar for a food dispenser having a cylindrical food chamber with a faceplate at one end and a rotation drive mechanism at another end, the beater bar comprising:
an axial body having a first end and a second end, and configured at the first end to engage a receptacle in the food dispenser faceplate when the faceplate is engaged with the cylindrical food chamber, and configured at the second end to engage the rotational drive mechanism at the other end of cylindrical food chamber, so that the axial body can rotate about a central axis in the food chamber;
a plurality of arms radially emanating from the axial body between the first end and the second end, each arm configured to engage at least a portion of a food dispenser scraper;
a plurality of food dispenser scrapers configured to be supported by two arms such that a leading edge of the scraper engages an inside surface of the food chamber when the body rotates, each scraper rotatably coupled to the two arms such that the trailing edge of the scraper is rotationally biased towards the axial body; and
at least one paddle emanating from the axial body adjacent the first end, and configured to extend toward but not contact the inside surface of the food chamber;
wherein the at least one paddle does not contact the faceplate when the faceplate is engaged with the cylindrical food chamber and is configured to mix food adjacent the faceplate with other food in the food chamber when the axial body rotates about the central axis; and
wherein the paddle comprises a first edge having a length, and wherein the first edge of the paddle engages the axial body so that there are no recesses or openings along substantially the entire length of the first edge that could trap particles or fluids.

2. The beater bar of claim 1, wherein the at least one paddle comprises a blade portion and a stem portion, and the stem portion engages the body at an axial location displaced from the first end.

3. The beater bar of claim 2, wherein the blade portion of the at least one paddle has a first axial gap between the faceplate and the blade portion, a second axial gap between the faceplate and the stem portion, and wherein the second gap is larger than the first gap.

4. The beater bar of claim 3, wherein the blade portion of the at least one paddle has a first radial gap between the blade portion and the axial body, and wherein the first radial gap is larger than the first axial gap.

5. The beater bar of claim 3, wherein edges of the at least one paddle adjacent the faceplate are rounded to reduce scratching of the faceplate.

6. The beater bar of claim 2, wherein the leading end of the at least one paddle extends beyond an end of the cylindrical food chamber.

7. The beater bar of claim 2, wherein the leading end of the paddle is configured to sweep a toroidal area of the faceplate without contacting the faceplate.

8. The beater bar of claim 4, wherein the blade portion comprises a leading end adjacent the faceplate, and a trailing end displaced axially away from the leading end toward the second end of the body, and wherein the trailing end is sloped with respect to the leading end.

9. The beater bar of claim 1 wherein the at least one paddle mixes food adjacent the faceplate to increase a consistency of food dispensed from the chamber.

10. The beater bar of claim 1 wherein the at least one paddle is configured to dislodge ice crystals that accumulate around a food dispensing path adjacent the faceplate.

11. A food dispenser, comprising:
a cylindrical food chamber having an open end, a second end, and an inside surface;
a faceplate configured to seal the open end of the food chamber, and having a inside and outside surface, the inside surface configured with a toroidal channel therein centered about a hub;
a beater bar comprising a central bar and having a first end and a second end, and configured at the first end to engage the hub in the faceplate, and configured at the second end to engage a rotational drive mechanism in the second end of the chamber, so that the beater bar can rotate about a central axis in the food chamber;
a plurality of arms radially emanating from the central bar between the first end and the second end, each arm configured to engage at least a portion of a food dispenser scraper such that a leading edge of the scraper engages the inside surface of the food chamber when the beater bar rotates; and
at least one paddle emanating from the central bar adjacent the first end, and configured to extend toward but not contact the inside surface of the food chamber, the at least one paddle configured to mix food adjacent the faceplate with other food in the chamber when the beater bar rotates about the central axis; and
the at least one paddle defines an edge that is flared with respect to a direction of the rotation of the beater bar.

12. The food dispenser of claim 11, wherein the at least one paddle comprises a blade portion and a stem portion, and the stem portion engages the beater bar at an axial location displaced from the first end.

13. The food dispenser of claim 12, wherein the blade portion comprises a leading end configured to follow a contour of the faceplate.

14. The food dispenser of claim 13, wherein the blade portion of the at least one paddle has a first axial gap between the faceplate and the leading end of the blade portion, a second axial gap between the faceplate and the stem portion, and wherein the second axial gap is larger than the first axial gap.

15. The food dispenser of claim 14, wherein the blade portion of the at least one paddle has a first radial gap between the blade portion and the beater bar, and wherein the first radial gap is larger than the first axial gap.

16. The food dispenser of claim 15, wherein the blade portion comprises a trailing end displaced axially away from the leading end toward the second end of the beater bar, and wherein the trailing end is sloped with respect to the leading end.

17. The food dispenser of claim 13, wherein the leading end of the at least one paddle extends beyond the open end of the food chamber.

18. The food dispenser of claim 11 wherein the at least one paddle is configured to mix food adjacent the faceplate to increase a consistency of food dispensed from the chamber.

19. The food dispenser of claim 11 wherein the at least one paddle is configured to dislodge ice crystals that accumulate around a food dispensing path adjacent the faceplate.

20. A beater bar for a food dispenser, comprising:
a central bar having a first end and a second end, and configured at the first end to engage a bearing surface in a food dispenser faceplate, and configured at the second end to engage a rotational drive mechanism, so that the central bar can rotate about a central axis in the food chamber;
a plurality of arms radially emanating from the central bar between the first end and the second end, each arm configured to engage at least a portion of a food dispenser scraper such that a leading edge of the scraper engages an inside surface of a food chamber when the central bar rotates; and
at least one paddle emanating from the central bar adjacent the first end, comprising a blade portion and a stem portion, the blade portion configured to radially extend toward but not contact the inside surface of the food chamber, the at least one paddle configured to mix food adjacent the faceplate with other food in the chamber when the central bar rotates about the central axis;
the at least one paddle secured to the central bar along the stem portion of the paddle so that there are no substantial openings between the stem portion of the paddle and the central bar where particles can be trapped; and
the at least one paddle defines a sloped trailing edge extending substantially from a first point to a second point, wherein the first point is located closer to the faceplate than the second point.

* * * * *